United States Patent [19]
Serita et al.

[11] Patent Number: 5,107,475
[45] Date of Patent: Apr. 21, 1992

[54] AUTOMATIC DISK CHANGER WITH A TRAY TRANSFER DEVICE

[75] Inventors: Kaoru Serita; Masaaki Kiyomiya; Jun Takahasi; Masatoshi Watanabe; Masaki Iwamoto, all of Saitama, Japan

[73] Assignee: Pioneer Electronic Corporation, Tokyo, Japan

[21] Appl. No.: 473,246

[22] Filed: Jan. 31, 1990

[30] Foreign Application Priority Data

| Jan. 31, 1989 | [JP] | Japan | 1-19556 |
| Jan. 31, 1989 | [JP] | Japan | 1-19557 |
| Jan. 31, 1989 | [JP] | Japan | 1-19558 |
| Jan. 31, 1989 | [JP] | Japan | 1-19561 |
| Jan. 31, 1989 | [JP] | Japan | 1-19562 |

[51] Int. Cl.$^5$ .................... G11B 17/02; G11B 17/22
[52] U.S. Cl. .................... 369/39; 369/33; 369/34; 369/75.2; 369/178; 369/191
[58] Field of Search ............ 369/34, 37, 38, 39, 369/42, 75.2, 178, 191, 196, 197

[56] References Cited

U.S. PATENT DOCUMENTS

| 2,004,016 | 8/1938 | Smyth | 369/36 |
| 2,458,496 | 1/1949 | Andrews | 369/39 |
| 2,521,046 | 9/1950 | Darwin | 369/39 |
| 4,682,313 | 7/1987 | Miyake | 369/39 |
| 4,701,899 | 10/1987 | d'Alayer | 369/38 |
| 4,752,920 | 6/1988 | d'Alayer | 369/38 |
| 4,757,401 | 7/1988 | Teranishi | 369/34 |
| 4,791,626 | 12/1988 | Staar | 369/37 |
| 4,814,592 | 3/1989 | Bradt | 369/34 |
| 4,827,463 | 5/1989 | Motoyoshi | 369/36 |
| 4,839,758 | 6/1989 | Honjoh | 369/34 |

FOREIGN PATENT DOCUMENTS

| 0168107 | 1/1986 | European Pat. Off. | 369/178 |
| 0061455 | 3/1988 | Japan | 369/178 |

Primary Examiner—Stuart S. Levy
Assistant Examiner—John C. Pokotylo
Attorney, Agent, or Firm—Sughrue, Mion, Zinn Macpeak & Seas

[57] ABSTRACT

An automatic disk changer is disclosed in which tray guides are provided on a large number of levels in a case at right and left portions thereof so that the center line of the guide on each of the levels at the right portion and that of the guide on the level at the left portion extend toward a tray transfer mechanism and meet each other in the form of a V. The tray transfer mechanism can be moved up and down between each of the guides and a disk player for playing a disk in a tray transferred by the tray transfer mechanism, be swung from a central portion to positions corresponding to the guides on each of the levels at the right and left portions, and be moved backward and forward, to and from each of the guides.

12 Claims, 24 Drawing Sheets

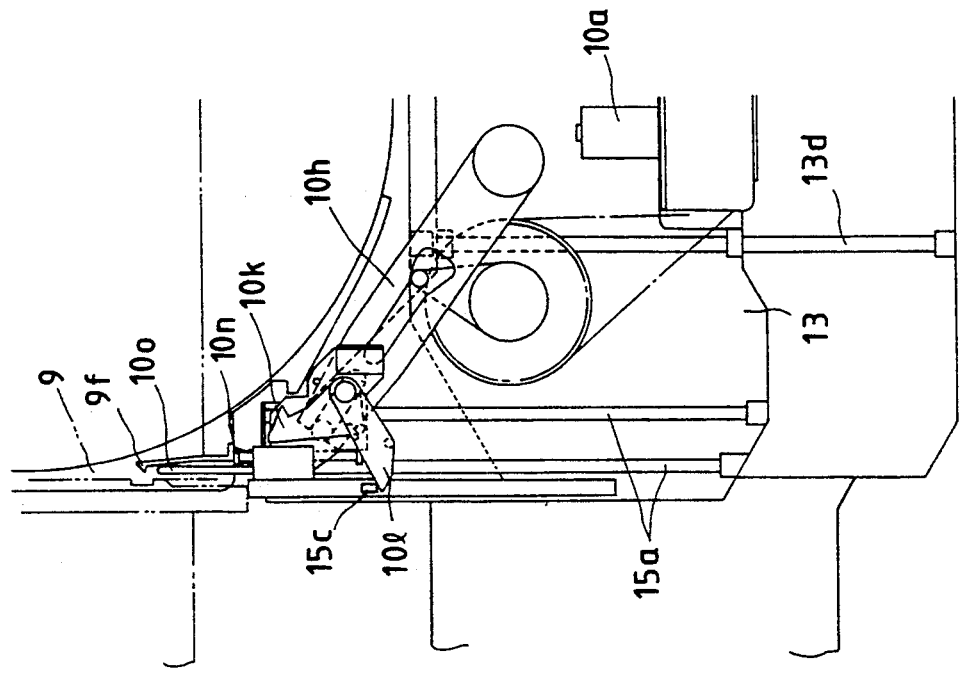
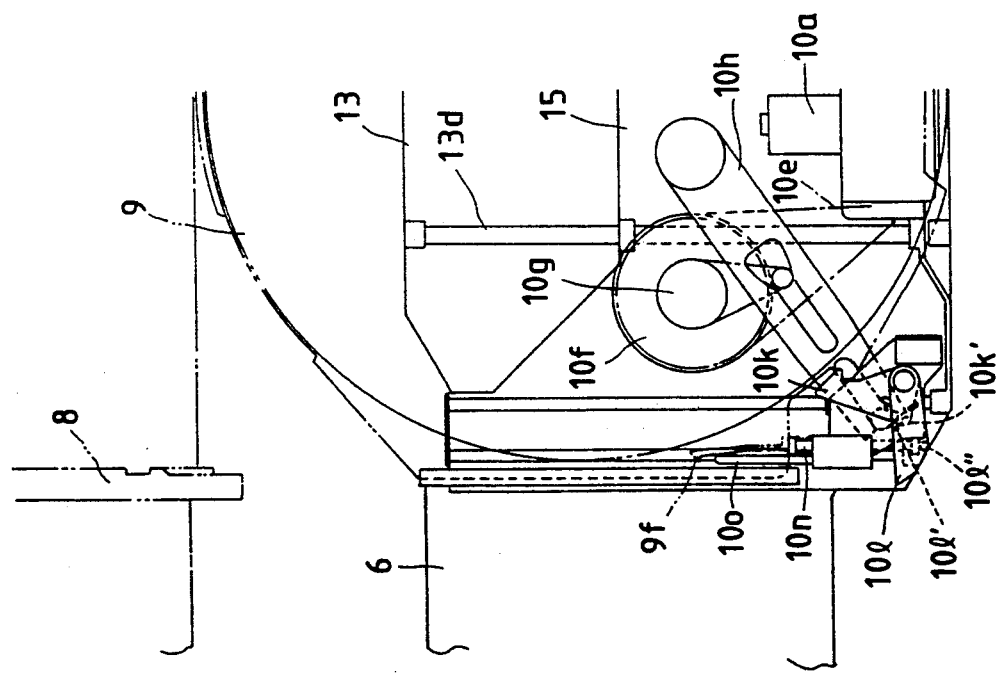

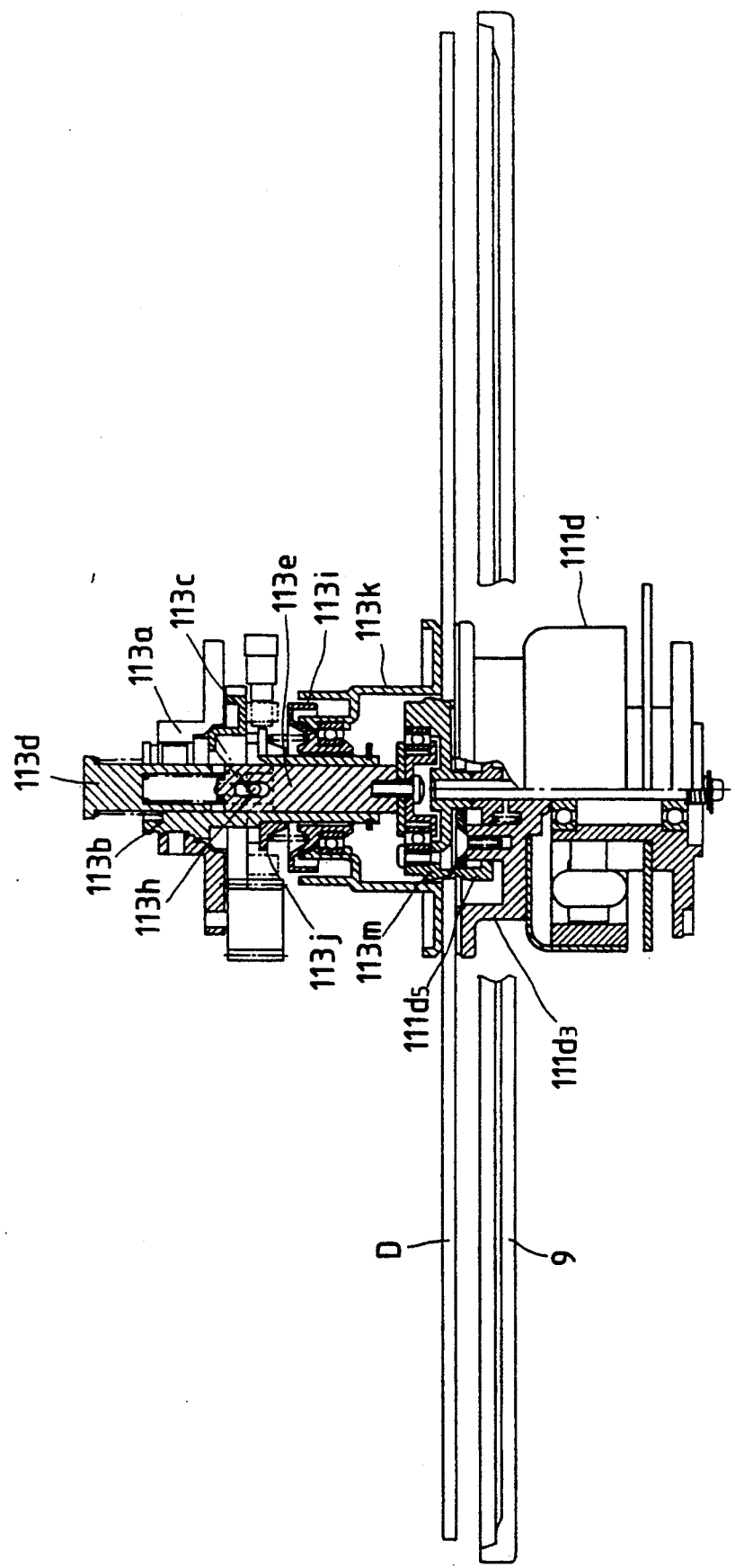

AUTOMATIC DISK CHANGER WITH A TRAY TRANSFER DEVICE

BACKGROUND OF THE INVENTION

The present invention relates to an automatic disk changer which houses a large number of disks such as video disks or compact disks and is manipulated outside to choose a desired disk and play it.

In a conventional automatic disk changer of such kind, pairs of guide grooves are provided on a large number of levels at one side portion of a case or at both the sides of a conveyance means, and trays containing disks are inserted in the guide grooves so that the trays can be pulled out from the grooves. A player for playing each of the disks is installed in the case at the upper or lower portion thereof. Each of the trays containing the disks can be pulled out from the guide groove by the conveyance means movable back and forth between the player and the trays and can then be conveyed to the player by the conveyance means so as to be played by the player.

Since the disks are piled up in a column at one side portion of the case of the conventional automatic disk changer or in columns at both the sides of the conveyance means, there are problems that the number of the disks which can be housed in the changer is relatively limited and the width of the case is very large. To pull out the tray from each tray guide and convey the pulled-out tray to the disk player, the depth of the case needs to be made not less than the sum of the depth of the tray housed in the tray guide and that of the tray pulled out therefrom. For that reason, there is a problem that the depth of the case is large. If a large number of disks are to be housed in the case limited in width and depth, the disks can be only piled up therein. For that reason, the height of the case is so large that there are problems that it is troublesome to place another disk in the case, and the length of the movement of the conveyance means is large, making it time-consuming to convey each of the disks to the disk player after choosing the disk.

Also, in a conventional disk automatic changer, a number of paired guide grooves are formed in a case and each tray receives the disk along the paired guide grooves.

On the other hand, a player for playing the disks is disposed in the upper or lower portion of the case. A tray transfer means is reciprocatingly moved between the player and the desired tray. The disk is pulled out from the case together with the tray by the tray transfer means to the player for reproduction of recorded information.

In addition, in the case where the tray is pulled out from the tray guide or the player by the tray transfer means, a pair of hook arms provided on the tray transfer means are engaged with engagement portions formed both on sides of the tray.

However, it is necessary to synchronously engage the pair of hook arms with the engagement portions of the tray in such a disk transfer means and it is very difficult to completely synchronize the pair of hook arms although a single motor is used in the conventional changer. Accordingly, the pair of hook arms are not synchronized with each other, so that the engagement between the engagement portions of the tray and the hook arms would be failed. The operation of the changer would not be insured.

Also, in the conventional automatic disc changer, the tray with the disk is locked to the tray guide so as to prevent the displacement of the tray relative to the tray guide within the case or the tray guide of the player.

Namely, hooks are formed in the tray guide and associated claws to be engaged with the hooks are formed in the tray. The engagement between the hooks and the claws causes the tray to be fixed to the tray guide. When the tray is pulled out by the tray transfer means, the hooks are moved by drive means such as plungers to thereby release the engagement therebetween.

However, in the means for fixing the tray to the tray guide means of the case and the disk player, it is necessary to provide for each tray guide the hooks driven by the plungers or the like, and it is necessary to provide a drive source of the plungers for releasing the engagement between the tray claws and the hooks. Accordingly, the structure of the changer is complicated, which leads to damage or breakdown of the mechanism and increases the manufacturing cost.

SUMMARY OF THE INVENTION

The present invention was made in order to solve the above-mentioned problems.

Accordingly, it is an object of the present invention to provide an automatic disk changer which has a case capable of housing twice as many disks as a conventional case of the same width, depth and height, and has a disk transfer means by which each of the disks can be set in a disk player at the same speed as a conventional automatic disk changer.

In the automatic disk changer provided in accordance with the present invention, pairs of right and left tray guides are provided so that the center line of each right tray guide and that of the left tray guide corresponding thereto extend toward the tray transfer means and meet each other in the form of a V and the center of swinging of the means is located inside the point of the meeting of the center lines. For that reason, the depth of the case can be reduced.

According to another aspect of the invention, there is provided an automatic disk changer characterized in that a tray transfer means, by which a tray is pulled out from a tray guide provided in a case and is then transferred to a disk player and by which said tray is pulled out from said player and then transferred to said guide, includes a moving base plate which is moved up and down between said guide and said player, a motor mounted on said plate, a worm which has two spiral grooves and is rotated by said motor, a pair of gears engaged with said worm and located opposite each other across said worm, a pair of large gears connected by endless belts to pulleys formed on the former gears, control arms which are swung along with the rotation of said large gears, and engagement arms which are moved backward or forward along the swing of said control arms so as to pull out or insert said tray.

According to the invention, there is provided an automatic disk changer in which one of the trays is pulled out by a tray transfer means from one of the tray guides provided on a large number of levels in a case and is then transferred to a disk player by said tray transfer means; and said tray is pulled out from said player and transferred back to said guide by said tray transfer means, characterized in that each of said trays is formed with elastic engagement lugs and hooks on both the sides of the tray; said tray guides provided in said case so as to guide said trays to insert them into said guides, and tray guides provided in said player are formed with projections, with which said lugs are engaged; and said means includes engagement arms, which are engaged with said hooks when said tray is pulled out from said guide, and disengaging pins for disengaging said lugs and said projections from each other.

According to the invention, there is provided a disk tray for an automatic disk changer in which said tray containing a disk is pulled out by a tray transfer means from one of tray guides provided on a large number of levels in a case and is then transferred to a disk player by said tray transfer means so that said disk is played by said player, characterized in that said tray is formed with a pair of elastic engagement lugs, which are engaged with projections formed on each of said guides or with projections formed on a tray guide provided in said player, in order to hold said tray in said guide by said engagement; and said tray is formed with hooks, which are engaged with the engagement arms of said tray transfer means in order to pull out said tray from each of said guides.

According to the invention, there is provided a tray transfer device for an automatic disk changer, in which a tray is pulled out from one of the tray guides provided on a large number of levels in a case at the right and left portions thereof and having center lines obliquely extending toward the center of said case. The tray is then transferred to a tray guide provided in a disk player, so that a disk in said tray is played by said player. The tray transfer device comprises a moving base which can be moved up and down between said player and each of said tray guides provided in said case. A swing plate is provided which can be put in three positions. One position is a front position on said base so that the swing plate is opposed to said guide provided in said player. Two positions are a front position on said base so as to be opposed to said guide provided in said player, and two positions on said base so as to be opposed to said guides provided in said case at the right and left portions thereof. A moving plate is provided which can be moved, on said swing plate, forward and backward relative to said guides as said swing plate is in each of said three positions. Engagement arms are provided and are attached to said moving plate so that said arms are engaged with said tray inserted in one of said guides, to pull out said tray therefrom, and are disengaged from said tray after said tray is inserted into another of said guides.

BRIEF DESCRIPTION OF THE DRAWINGS

FIGS. 9, 10 and 11 are plan views of the part in moved states;

FIGS. 22, 23, 24, 25 and 26 are partial sectional views of a turntable unit and the clamper in states of pinching a disk.

DESCRIPTION OF THE PREFERRED EMBODIMENTS

Figure 1:
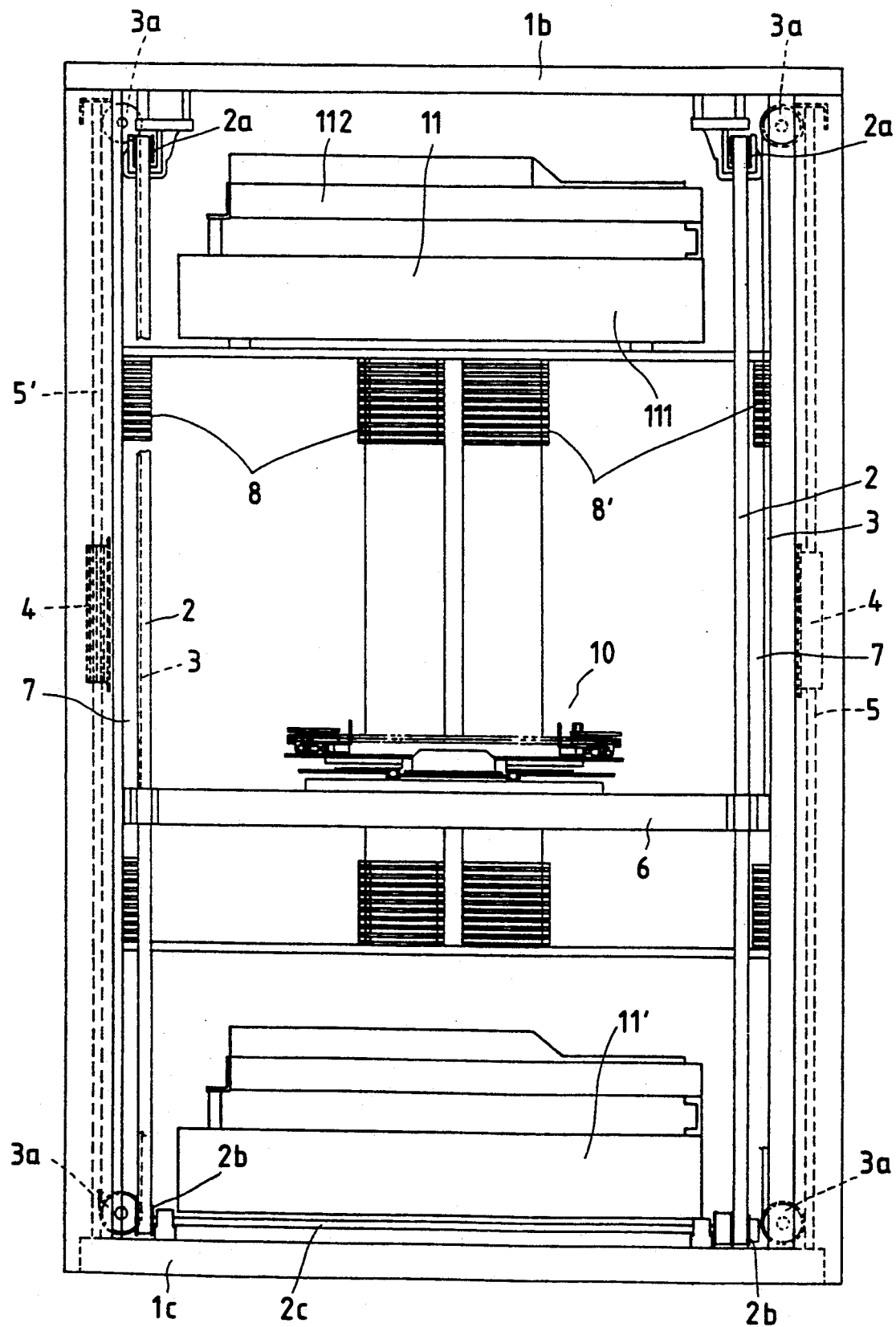
FIG. 1 is a front view of an automatic disk changer which is an embodiment of the present invention.
Figure 2:
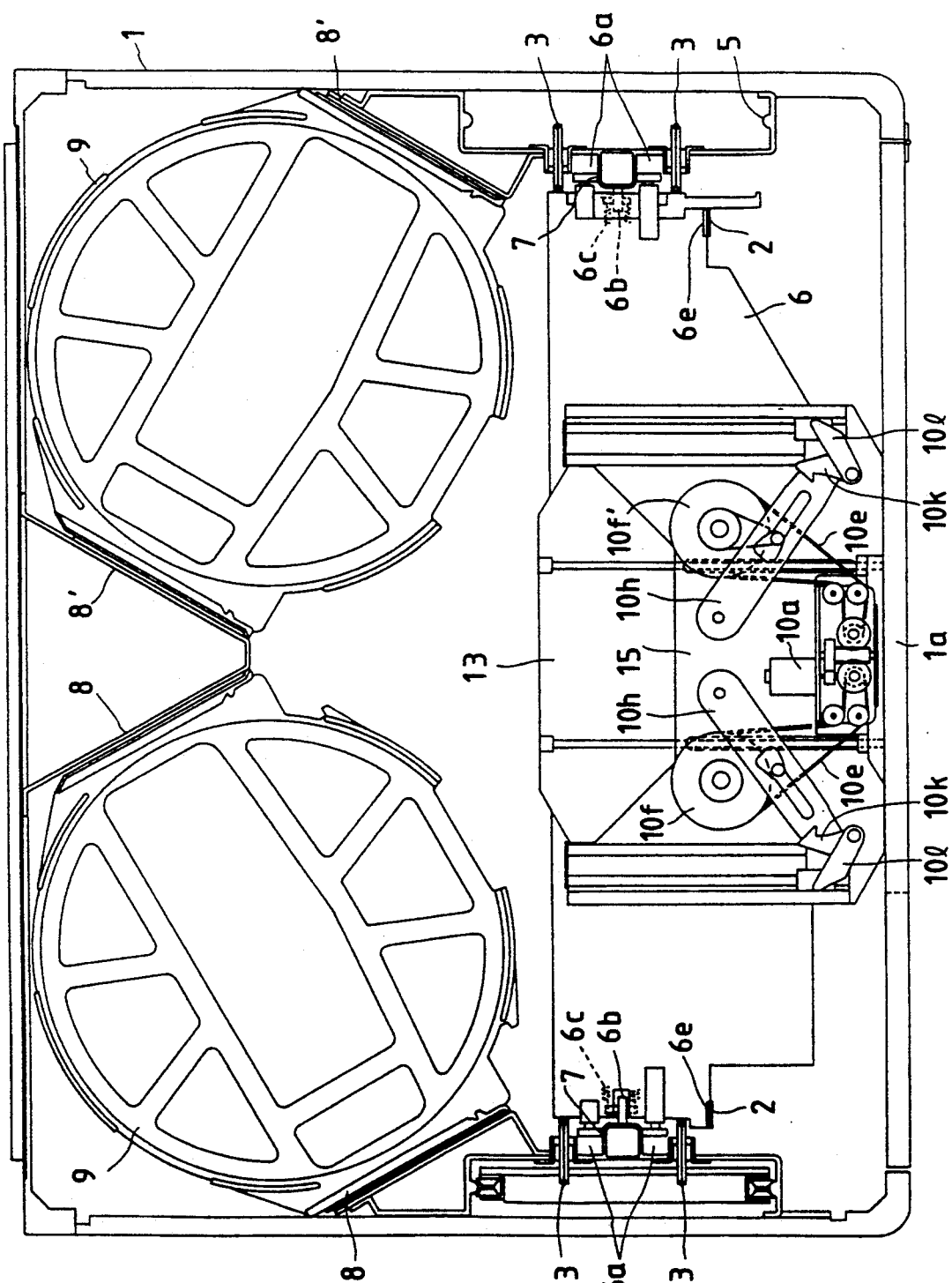
FIG. 2 is a plan view of the changer.
Figure 3:
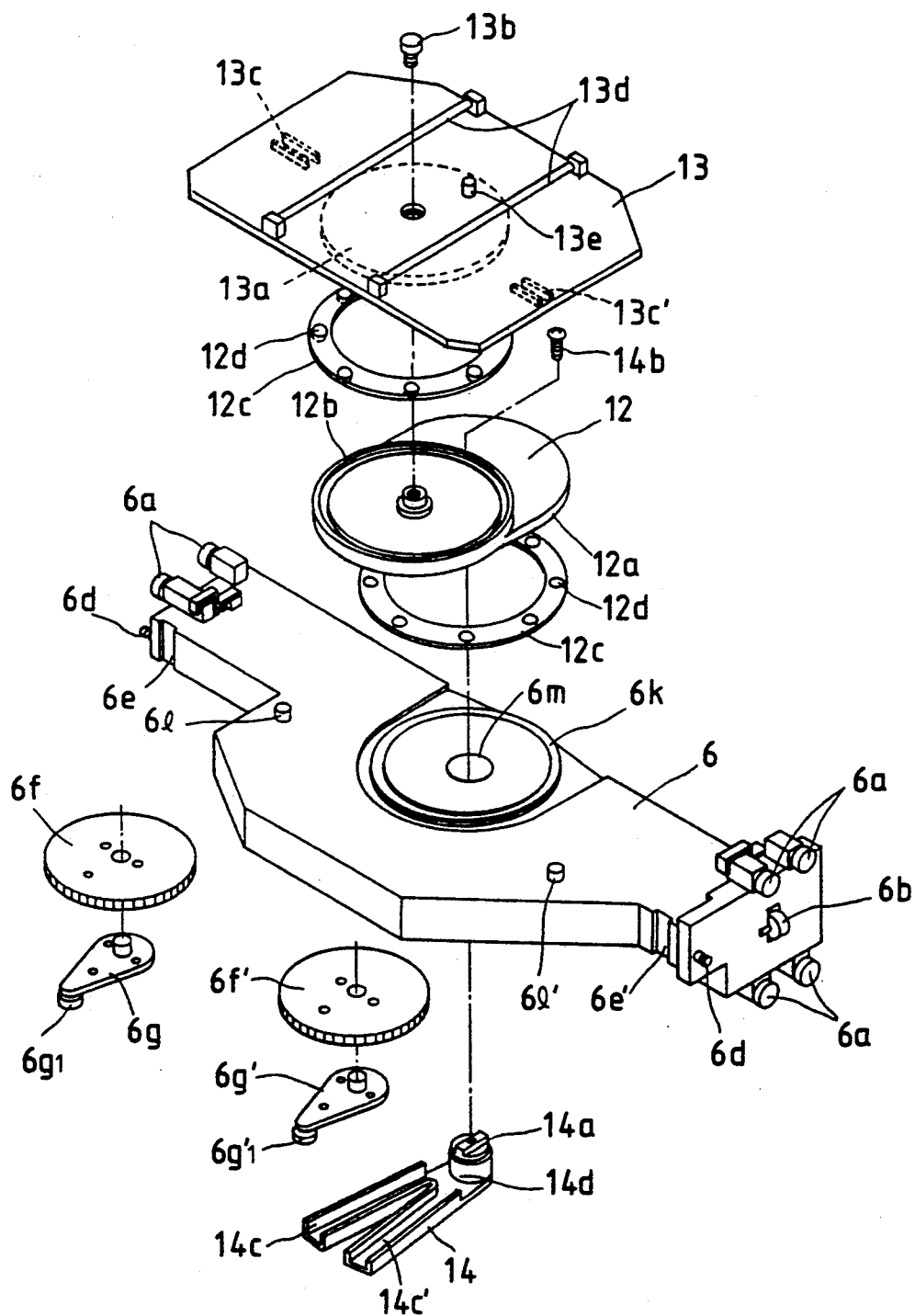
FIG. 3 is a partial perspective exploded view of the disk transfer means of the changer.

An embodiment of the present invention is hereafter described with reference to the drawings attached hereto. FIG. 1 is a front view of an automatic disk changer which is the embodiment. FIG. 2 is a plan view of the automatic disk changer. The changer includes a case 1, a pair of timing belts 2, endless wires 3, weights 4, guide rails 5, a moving rest 6, and guide rails 7. The case 1 is fitted with a door 1a openable forward. The timing belts 2 are wound on right and left timing pulleys 2a supported at the top plate 1b of the case 1, and right and left timing pulleys 2b supported at the bottom plate 1c of the case. The timing belts 2 are connected to each other by a single shaft 2c so that the belts are revolved synchronously with each other when the shaft is rotated by a motor not shown in the drawings. The endless wires 3 are wound on right and left pulleys 3a supported at the top plate 1b and the bottom plate 1c. The weights 4 are secured to the ends of the wires 3 so that the weights are balanced to the moving rest 6. When the wires 3 are revolved, the weights 4 are moved while being guided by the guide rails 5 secured to the case 1. The moving rest 6 is moved while being guided by the guide rails 7 extending in parallel with the other guide rails 5. The rest 6 is coupled to the timing belts 2 and the portions of the wires 3 opposite the other portions thereof, to which the weights 4 are secured. The rest 6 is moved while being guided by the guide rails 7 as shown in FIGS. 2 and 3. Eight guide rollers 6a and two guide rollers 6b are attached to the moving rest 6 at both the ends thereof so that the guide rollers 6a are located on the fronts and rears of the guide rails 7 and the other guide rollers 6b are located on the sides of the rails. The guide rollers 6b are urged by springs 6c so that the moving rest 6 does not move either rightward or leftward relative to the guide rails 7 because of a clearance. The wires 3 are anchored to projections 6d provided on the end faces of the moving rest 6. The timing belts 2 are secured to the rest 6 in the groove 6e thereof.

Moving the rest 6 up and down is described in detail from now on. When the motor not shown in the drawings is driven, the shaft 2c is rotated to revolve the timing belts 2 to move the rest 6 up or down depending on the direction of the rotation of the motor while the rest is guided by the guide rails 7. At that time, since the weights 4 secured to the wires 3 anchored to the rest 6 are balanced to the rest, the rest is smoothly moved up or down even if the torque of the motor is not high.

Tray guides 8 and 8' are provided on a large number of levels in the case 1 at the posterior portion thereof so that the angle between the center lines of the tray guides 8 and 8' is about 60 degrees. Each of the tray guides 8 and 8' consists of a pair of right and left rails for guiding a tray 9 described hereinafter. The mutually facing sides of the rails of each of the tray guides 8 and 8' have grooves, into which the side edges of the tray 9 are inserted so that the side edges can be pulled out from the grooves.

A tray transfer means 10 is provided on the top of the moving rest 6. The means 10 functions so that the tray 9 is pulled out from the tray guide 8 or 8' and then transferred to one of disk players 11 and 11' installed in the case 1 at the upper and lower portions thereof. The tray transfer means 10 also functions so that the tray 9 containing a disk D having been played by the disk player 11 or 11' is transferred back to the prescribed tray guide 8 or 8'.

Figure 4:
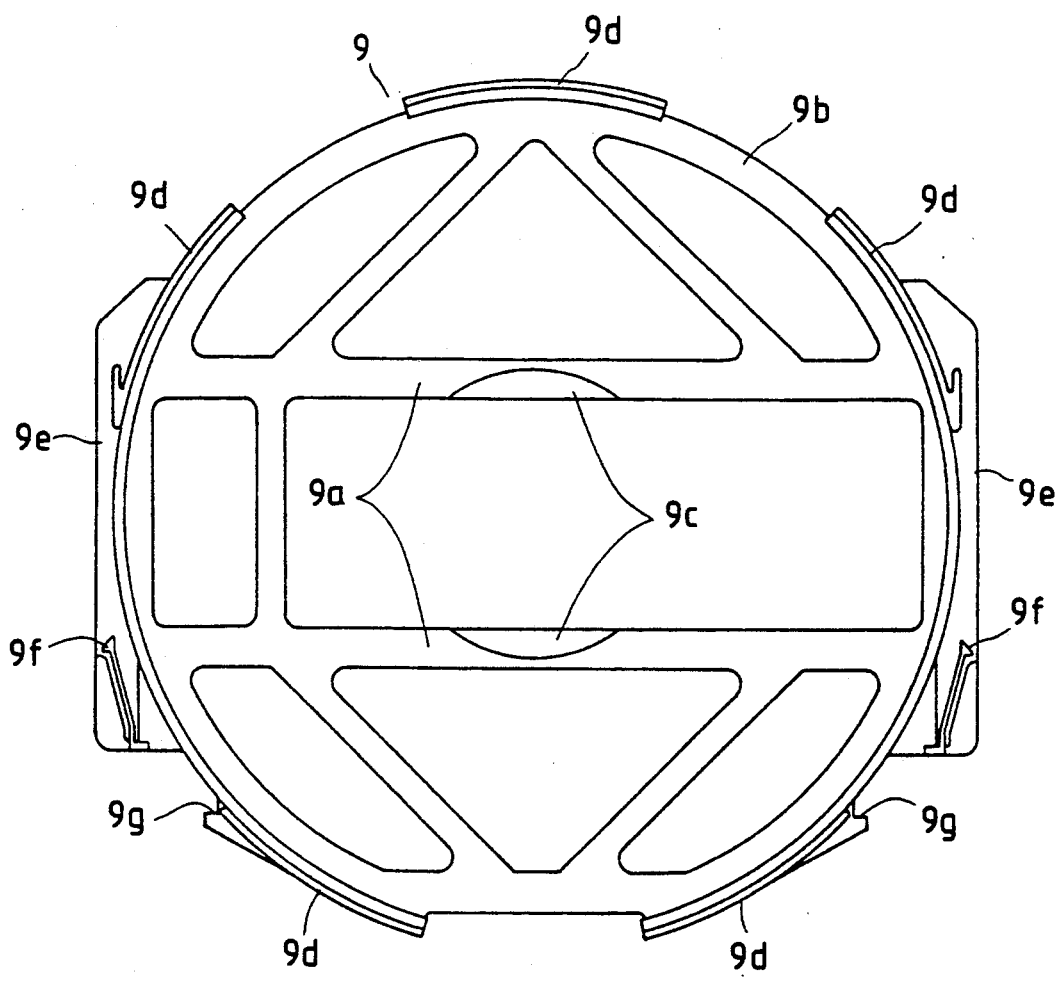
FIG. 4 is a plan view of the tray of the changer.
Figure 8:
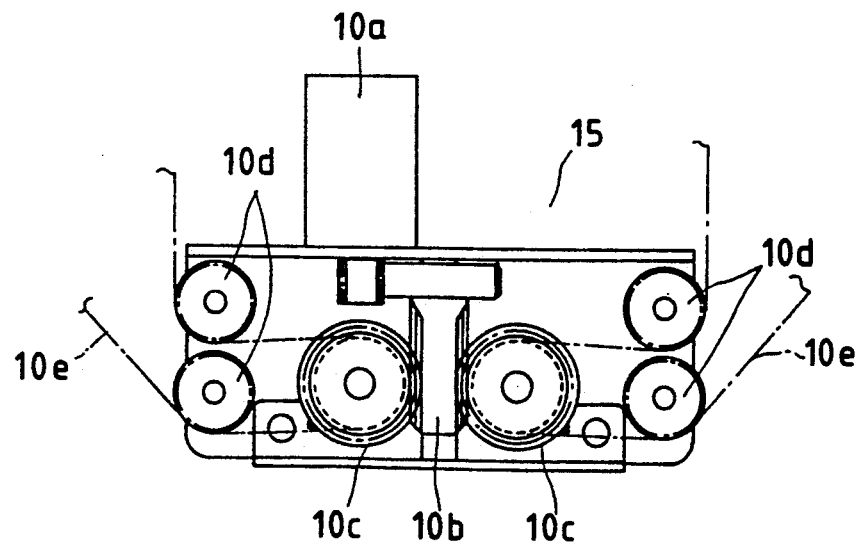
FIG. 8 is a partial enlarged plan view of the part shown in FIG. 7.

The tray 9 is now described in detail with reference to FIG. 4. The tray 9 has such a size that the disk D of 30 cm in diameter, for example, may be contained in the tray. The tray 9 is made from a steel plate of suitable rigidity, which is punched to have only a plurality of slender portions to decrease the weight of the tray. The central slender portions 9a and peripheral slender portions 9b of the tray 9 are integrally formed with protective portions 9c and 9d which are located in prescribed positions and made of a synthetic resin to prevent the disk D from coming into contact with the steel body of the tray so as to be scratched or damaged. The protective portions 9d on the peripheral slender portions 9b have vertical projections for guiding the disk D, and are formed with projections 9e in mutually opposite positions so that the projections are inserted into the tray guide 8 or 8'. The peripheral slender portions 9b are also formed with elastic engagement lugs 9f, which are engaged with the projections 8a of the tray guide 8 or 8'. The projective portions 9d on the peripheral slender portions 9b are formed with hooks 9g, which are engaged with the engagement arms 10k of the tray transfer means 10.

A mechanism for pulling out the tray 9 from the tray guide 8 or 8' and then setting the tray in the disk player 11 or 11' and for pulling out the tray from the player and returning the tray to the tray guide is described in detail with reference to FIGS. 2, 3, 5, 6, 7, 8, 9, 10, 11, 12, 13 and 14 from now on. Two gears 6f and 6f', to the bottoms of which swing arms 6g and 6g' are secured, are supported under the moving rest 6 and engaged with the smaller gear of a double gear unit 6h whose larger gear is engaged with a worm 6j, which is rotated by a motor 6i secured to the bottom of the moving rest. When the motor 6i is driven, the gears 6f and 6f, are rotated in the same direction as each other through the worm 6j and the double gear unit 6h. The top of the moving rest 6 has an annular recess 6k between a pair of projections 6l and 6l'. A rotary circular plate unit 12 consists of two circular plates integrally and eccentrically conjoined to each other and having annular projections 12a and 12b on the obverse sides of the plates so that the annular projection 12a is fitted in the annular recess 6k of the moving rest 6 and the other annular projection 12b is fitted in the annular recess 13a of the bottom of a swing plate 13 described hereinafter. The circular plate having the annular projection 12a fitted in the annular recess 6k of the top of the moving rest 6 is rotatably coupled, by a screw 14b, to the pivot 14a of a swing member 14, which is inserted into the center hole 6m of the moving rest from under it. The swing plate 13, having an annular recess 13a of which the annular projection 12b of the top of the rotary circular plate unit 12 is fitted, is secured thereto by a screw 13b inserted into the swing plate from over it. The swing plate 13 has guide grooves 13c and 13c' in the right and left portions of the bottom thereof. The projections 6l and 6l' of the moving rest 6 are optionally inserted into the guide grooves 13c and 13c' so that the rest is guided by the grooves. The swing plate 13 is provided with a pair of guide bars 13d extending in parallel with each other on the top of the plate. A retainer 12c is provided between the moving rest 6 and the rotary circular plate unit 12 along the annular projection 12a thereof. Another retainer 12c is provided between the swing plate 13 and the rotary circular plate unit 12 along the annular projection 12b thereof. Balls 12d are fitted in the holes of the retainers 12c. The swing member 14, whose pivot 14a is secured to the rotary circular plate unit 12 by the screw 14b, has a notch 14d near the pivot, and a pair of guide grooves 14c' extending in mutually different directions from the notch. Rollers $6g_1$ and $6g'_1$ provided on the swing arm 6g and 6g' at the tips thereof are optionally inserted into the guide grooves 14c and 14c' so that the rollers are guided. The pivot 14a is formed with a flange 14e extending by about 180 degrees in angle along the circumference of the pivot. Three switches $S_1$, $S_2$ and $S_3$ are disposed at angular intervals of about 90 degrees each so that the switches are turned on when they come into contact with flange 14e.

The tray transfer means 10 is provided on the top of a moving plate 15, which is moved backward and forward while being guided by the guide bars 13d of the swing plate 13. The tray transfer means 10 includes a motor 10a, a worm 10b, a pair of gears 10c, two pulleys 10d, belt 10e, a pair of large pulleys 10f, swing arms 10g, a pair of control arms 10h, a moving arm 10i, moving members 10j, the engagement arms 10k, return arms 10l, wound springs 10m, and rods 10n. The motor 10a is secured to the moving plate 15. The worm 10b has two spiral grooves, and is rotated by the motor 10a. The gears 10c are engaged with the worm 10b at both the sides thereof. The belts 10e are wound on pulleys formed on the gears 10c, the pulleys 10d and the large pulleys 10f so that the gears are connected to the large pulleys. The swing arms 10g are secured to the large pulleys 10f. Each of the control arms 10h are supported at one end thereof by the moving plate 15 Rollers 10g' on the swing arms 10g are fitted in slender holes 10h, slenderly extending in the control arms 10h in the longitudinal directions thereof. One end of the moving arm 10i is swung, under the moving plate 15, together with one of the control arms 10h. The other end of the moving arm 10i is engaged with the projection 13e of the swing plate 13. The moving member 10j is engaged with the tips of the control arms 10h, and guided by two pairs of guide bars 15a provided on the right and left portions of the moving plate 15. The engagement arms 10k and the return arms 10l are rotatably supported by pins 10j' planted in the moving members 10j. The left-hand engagement arm 10k and the left-hand return arm 10l are urged clockwise by one of the wound springs 10m, while the right-hand engagement arm 10k and the right-hand return arm 10l are urged counterclockwise by the other of the springs. The rods 10n are supported by the moving members 10j slidably relative thereto, and are urged by springs 10n' in such directions as to move the moving members 10j forward. Projections 10k' provided on the tops of the engagement arms 10k are engaged with projections 10l' provided on the bottoms of the return arms 10l. Projections 10l" provided on the bottoms of the return arms 10l are engaged with the front ends of the rods 10n. Since the projections 10l" of the return arms 10l are in contact with the front ends of the rods 10n and the projections 10k' of the engagement arms 10k are in contact with the projections 10l of the return arms 10l, the swinging forces of the wound springs 10m are controlled so that the tray transfer means 10 is put in a state shown in FIG. 7. Disengaging pins 10o for disengaging the elastic engagement lugs 9f of the tray 9 from the projections 8a of the tray guide 8 or 8' when the pins come into contact with the lugs project from the moving members 10j so that the tips of the pins are located behind those of the rods 10n. Guide grooves 15b for guiding the tray 9 are provided in the moving plate 15 along both the side edges thereof. Restrictors 15c, which are freely turnable backward but not turnable forward, are attached to the top of the moving plate 15 and located in the rear half portions of the guide grooves 15b so that the restrictors are engaged with the return arms 10l when the tray 9 is returned to the tray guide 8 or 8' provided in the case 1.

Transferring the tray 9 is described in detail from now on. Before the transferring of the tray 9 is started, the automatic disk changer is in a state shown in FIG. 5. In that state, the rollers $6_{g1}$ and $6g'_1$ on the swing arms 6g and 6g', remain inserted in the guide grooves 14c and 14c' of the swing member 14 in the central position thereof, the projections 6l and 6l' provided on the moving rest 6 remain inserted in the guide grooves 13c and 13c, provided in the bottom of the swing plate 13, and the switch $S_2$ remains turned on by the flange 14e. When electric power is then applied to the motor 6i so that the gears 6f and 6f' are rotated clockwise with regard to FIG. 6, the swing arm 6g remains inserted in the guide groove 14c of the swing member 14 and the other swing arm 6g' is moved out from the guide 14c of the swing member so that the member is swung clockwise by the swing arm 6g. At that time, the projection 6l remains inserted in the guide groove 13c, and the other projection 6l' is moved out from the guide groove 13c'. As a result, the swing plate 13 is swung clockwise on the rotary circular plate unit 12 relative to the moving rest 6 about the engaged portions of the projection 6l and the guide groove 13c. When the swing member 14 is swung by an angle of about 90 degrees so that the switch $S_3$ is turned on by the flange 14e, the application of the electric power to the motor $6_i$ is ceased so that the swing plate 13 is stopped in a swung position shown in FIG. 6. If the gears 6f and 6f' are rotated counterclockwise with regard to FIG. 6 by the reverse rotation of the motor 6i, the swing member 14 is swung counterclockwise so that the swing plate 13 is swung clockwise about the engaged portions of the projection 6l' and the guide groove 13c'. When the swing plate 13 is thus swung counterclockwise or clockwise, the plate is opposed to the tray 9 inserted in the tray guide 8 or 8' in the case 1.

Figure 9:
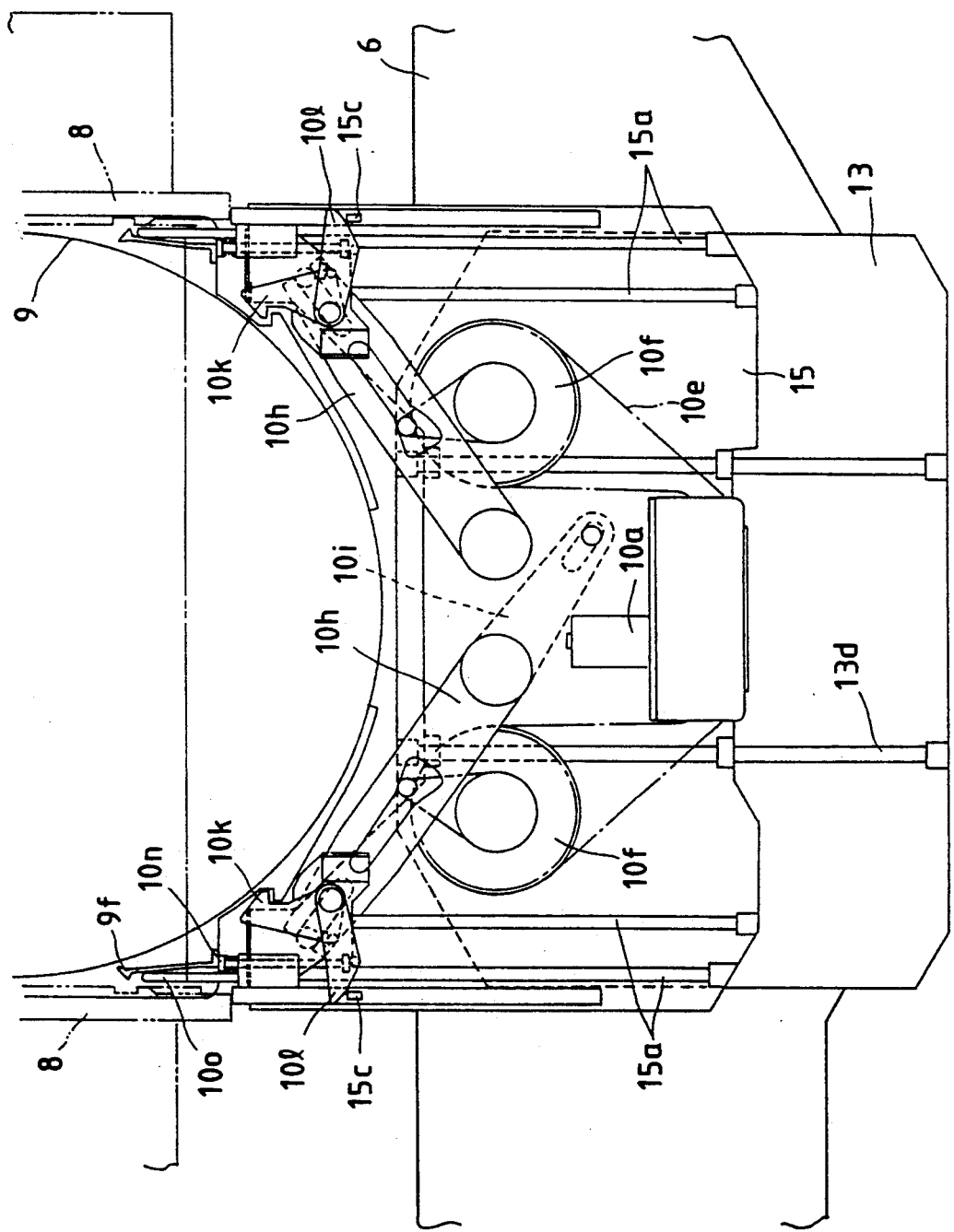

When the switch $S_j$ is turned on so that the swing plate 13 is stopped as mentioned above, electric power is applied to the motor 10a so that the double-grooved worm 10b is rotated. As a result, the gears 10c are rotated so that the large pulleys 10f are rotated, in directions shown in FIG. 7, by the belts 10e wound on the pulleys formed on the gears 10c. The worm 10b is provided with the two spiral grooves so that the gears 10c engaged with the worm are rotated synchronously with each other. Since the large pulleys 10f are thus rotated, the swing arms 10g secured thereto are swung in the same directions as the rotation of the pulleys so that the pair of control arms 10h and the moving arm 10i are swung. When the moving arm 10i is swung counterclockwise with regard to FIG. 7, the moving plate 15 is moved backward to the vicinity of the tray 9 inserted in the tray guide 8 or 8' in the case 1, while being guided by the guide bars 13d, because the tip of the moving arm is engaged with the projection 13e of the swing plate 13. When the pair of control arms 10h are swung in the same direction as the swing arm 10g, the moving members 10j engaged with the tips of the control arms 10h are moved backward while being guided by the guide bars 15a. The end of the backward movement is shown in FIG. 9. Immediately before the end of the backward movement of the moving members 10j, the disengaging pins 10o come into contact with the elastic engagement lugs 9f of the tray 9 to disengage the lugs from the projections 8a of the tray guide 8 or 8', and the rods 10n come into contact with the projections 9e of the tray 9 and move forward against the forces of the springs 10n' to swing the return arms 10l against the forces of the wound springs 10m. At that time, the engagement arms 10k come into contact with the hooks 9g of the tray 9 and are then swung against the forces of the wound springs 10m and thereafter engaged with the hooks as shown in FIG. 9.

Figure 12:
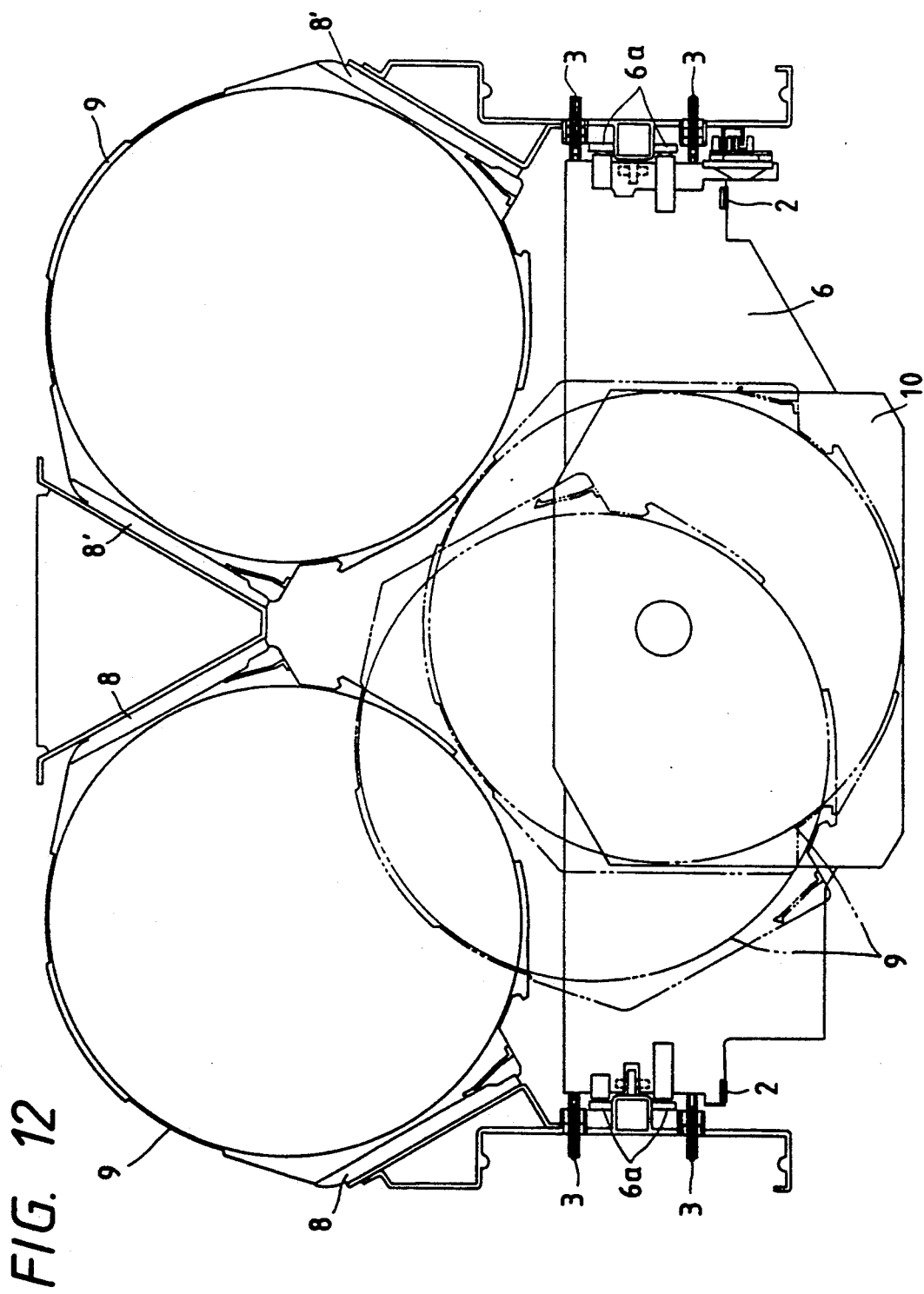
FIGS. 12, 13 and 14 are plan views of a disk transferred by the means.
Figure 13:
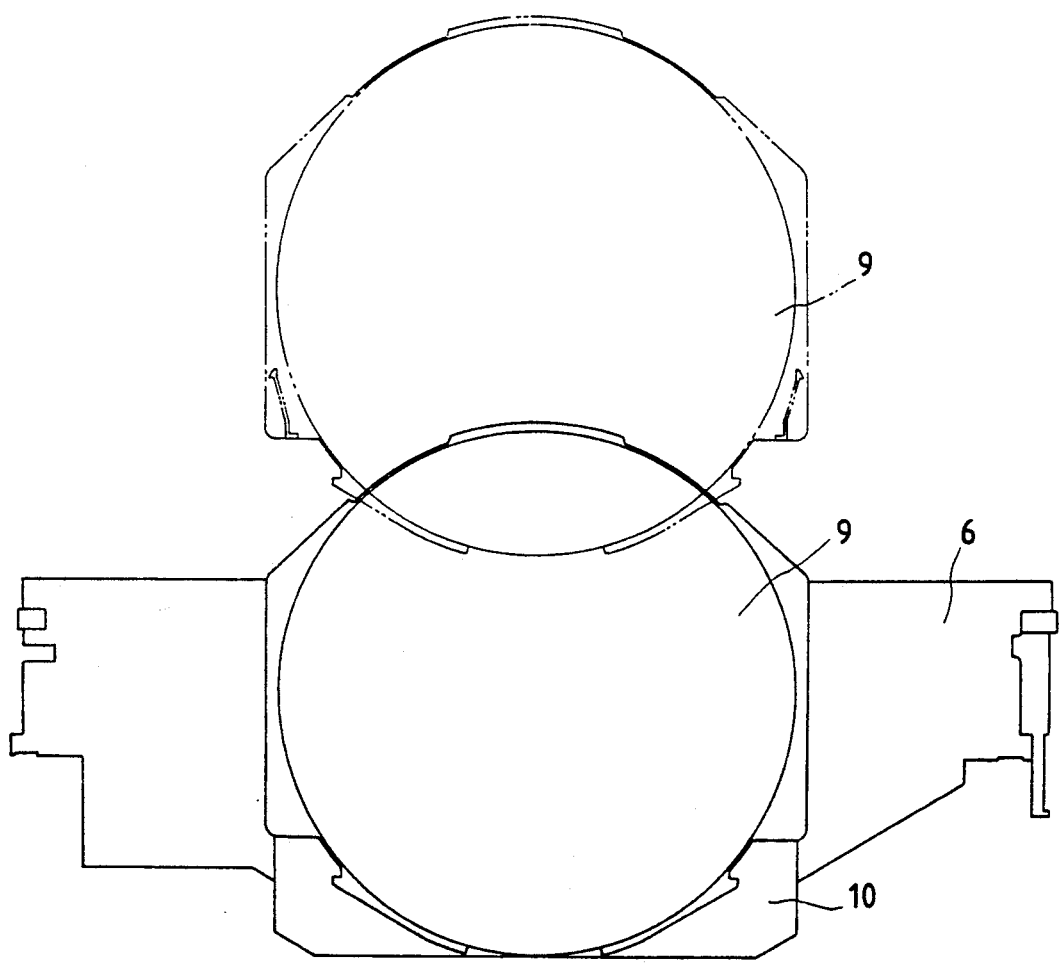

After the completion of the backward movement of the moving members 10j is detected by a switch not shown in the drawings, the motor 10a is stopped and then rotated in reverse so that the moving plate 15 and the moving members 10j are moved forward. At the time of the forward movement of the moving members 10j, the engagement arms 10k are already engaged with the hooks 9g of the tray 9, and the elastic engagement lugs 9f of the tray are already disengaged from the projections 8a of the tray guide 8 or 8' by the disengaging pins 10o having come into contact with the lugs. For that reason, the moving plate 15 and the moving members 10j are moved forward to the original positions thereof as shown in FIGS. 10 and 12, while pulling out the tray 9 from the tray guide 8 or 8' into the guide grooves 15b of the moving plate. Although the return arms 10l come into contact with the restrictors 15c in the guide grooves 15b of the moving plate 15 during the forward movement of the moving members 10j, the return arms pass by the restrictors while turning them forward, because the restrictors are turnable forward as mentioned above.

Figure 5:
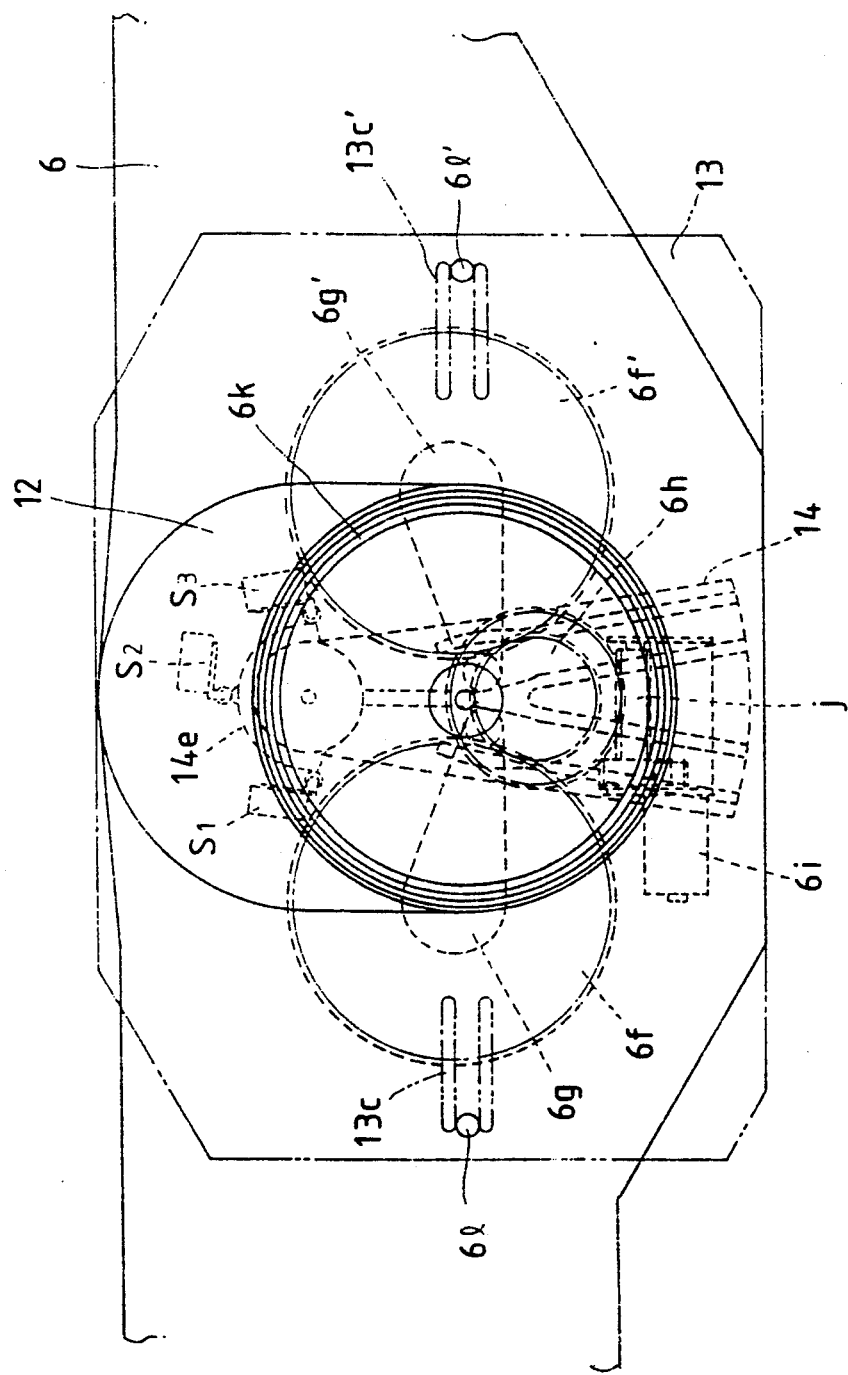
FIG. 5 is a plan view of a part of the means.
Figure 6:
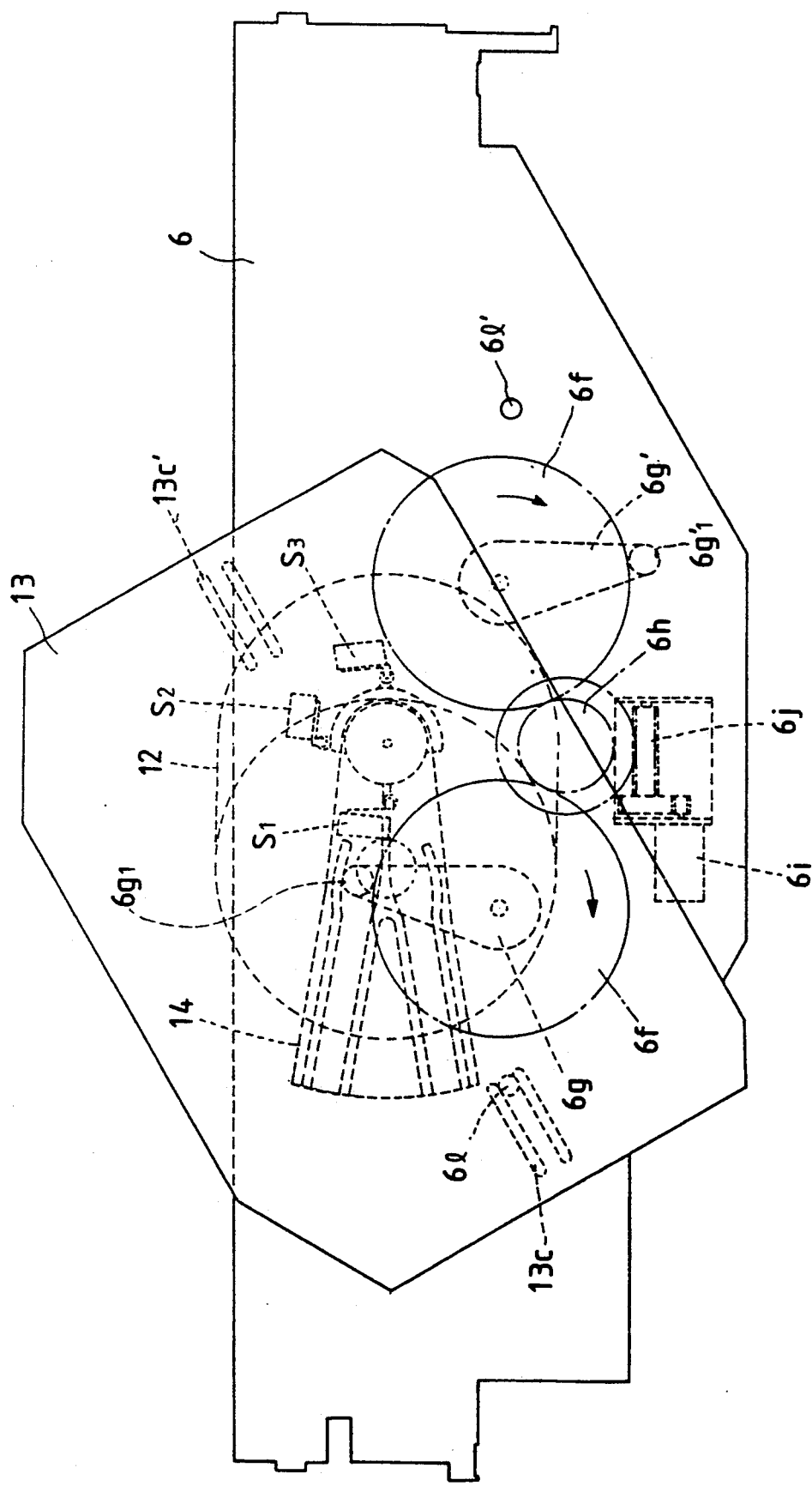
FIG. 6 is a plan view of the part of the means in a moved state.
Figure 7:
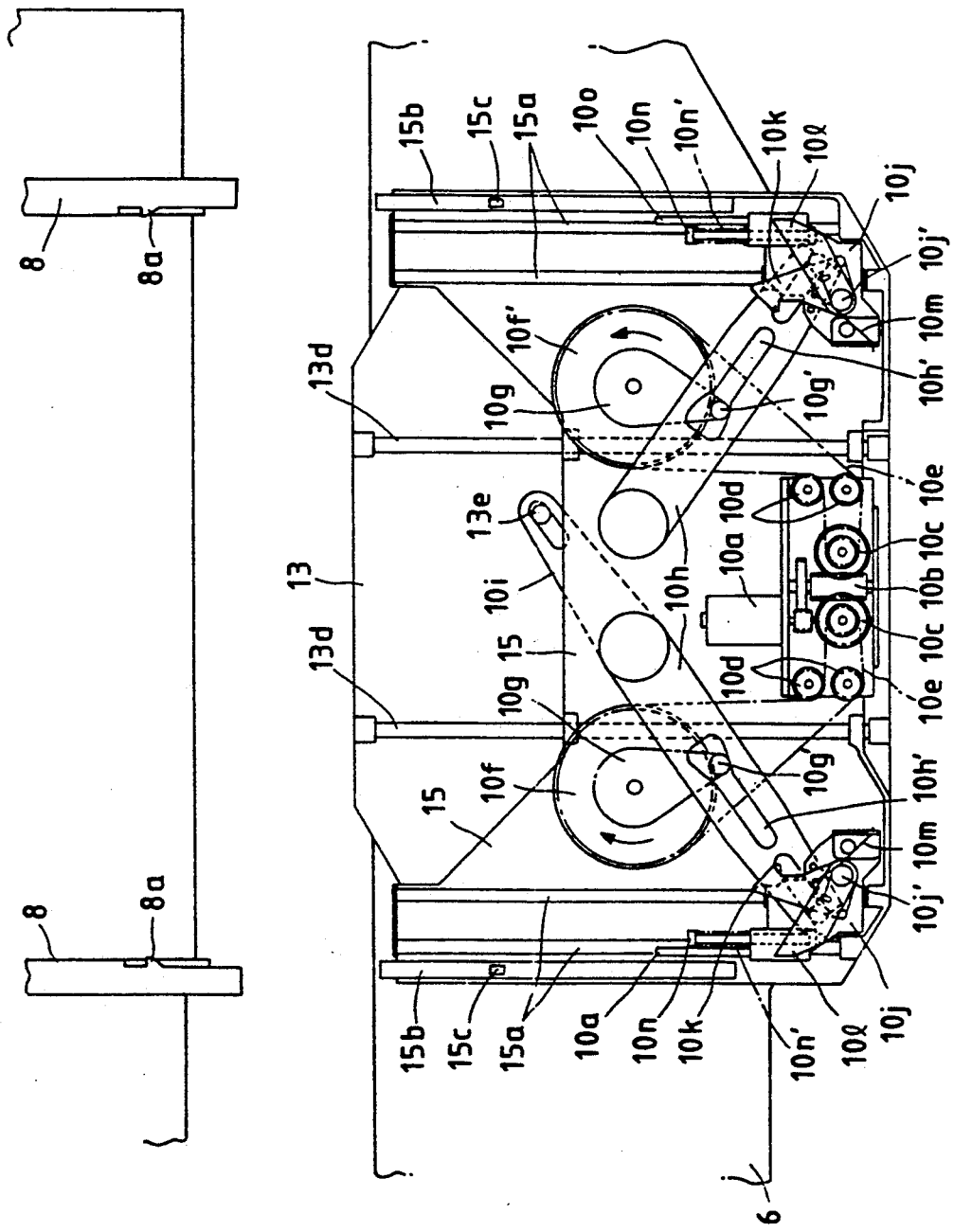
FIG. 7 is a plan view of another part of the means.
Figure 19:
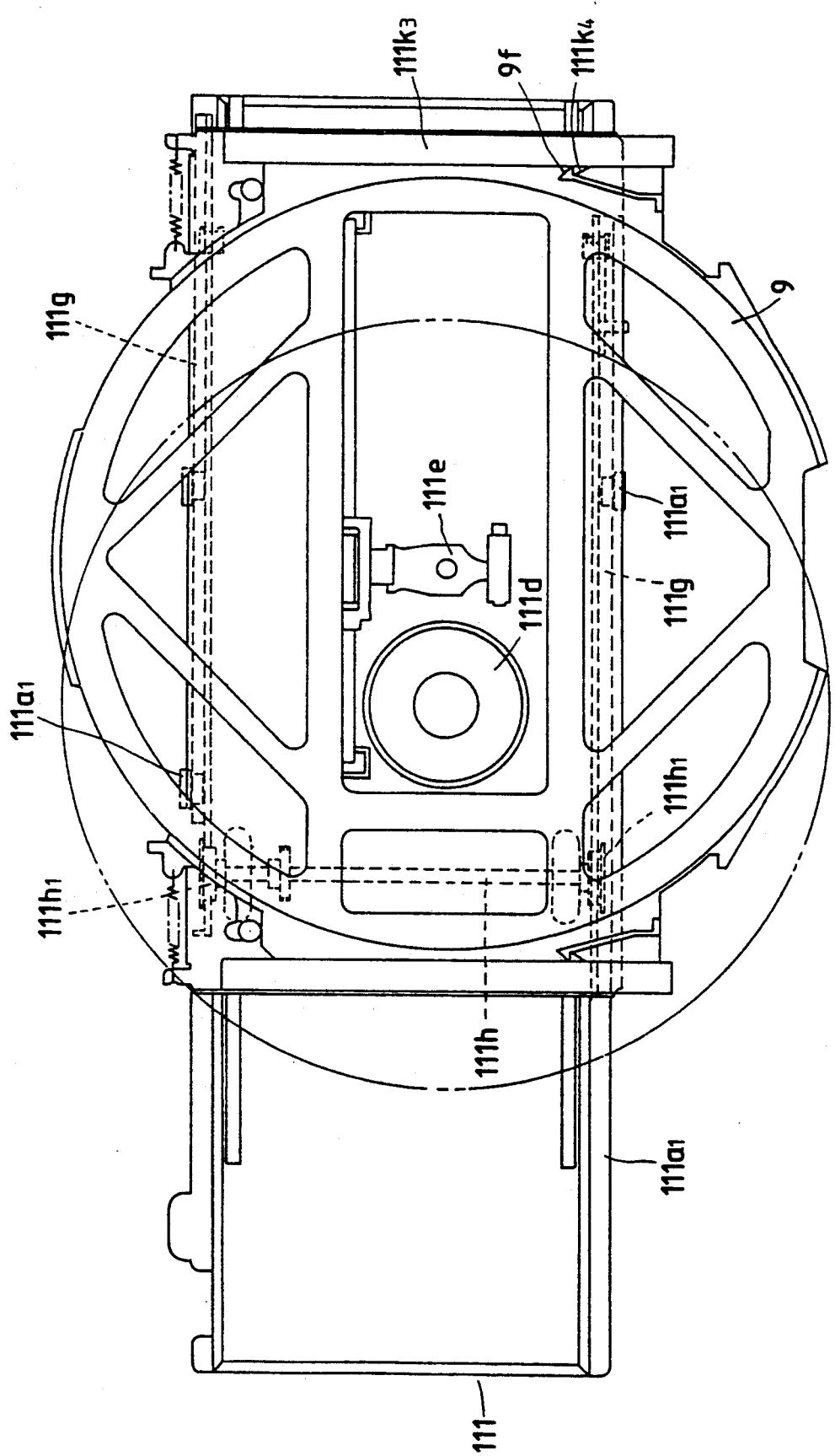
FIG. 19 is a plan view of the player unit fitted with the tray moving frame in a moved state.

While the forward movement of the moving plate 15 and the moving members 10j to the original positions thereof is completed, the switch not shown in the drawings acts to stop the rotation of the motor 10a and apply electric power to the motor 6i so that an operation reverse to that described above is performed to return the swing plate 13 to a neutral position shown in FIG. 5. When the switch $S_2$ is then turned on, the application of the electric power to the motor 6i is ceased so that the rotation of the motor is stopped. At that time, electric power is applied to the motor 10a again so that the moving plate 15 and the moving members 10j are moved backward. Because of the backward movement of the moving members 10j, the tray 9 is moved backward while being pulled out from the guide grooves 15b of the moving plate 15 and inserted into the guide grooves 111$k_3$ (FIG. 19) the disk player 11 or 11' described hereinafter. Immediately before the end of the backward movement of the moving members 10j, the return arms 10l come into contact with the restrictors 15c as shown in FIG. 11. Since the restrictors 15c are not turnable backward, the return arms 10l are swung against the forces of the wound springs 10m so that the projections 10k' of the engage-arms 10k engaged with the projections 10l' of the return arms are pulled. As a result, the engagement arms 10k are also swung against the forces of the would springs 10m in the same directions as the return arms 10l so that the engagement arms are disengaged from the hooks 9g of the tray 9. After the disengagement, the tray 9 is pushed in to the ends of the guide grooves 111$k_3$ by the rods 10n urged by the springs 10n'. When the backward movement of the moving plate 15 and the moving members 10j to the ends of the strokes thereof is completed, the application of the electric power to the motor 10a is ceased so that the movement is stopped, in the same manner as that described above, in a state shown in FIGS. 11 and 13. After the stoppage of the movement, the motor 10a is rotated in reverse so that the moving plate 15 and the moving members 10j are moved forward. Since the disengaging pins 10o are put out of contact with the elastic engagement lugs 9f because of the forward movements of the moving members 10j, as shown in FIG. 19 the lugs are engaged with hooks 111$k_4$ provided at the guide groove 111$k_3$ of the disk player 11 or 11' and the rods 10n continue to push the tray 9 by the forces of the springs 10n'. As a result, the tray 9 is set in the disk player 11 or 11'.

After the disk D in the tray 9 is played by the disk player 11 or 11', the tray is returned to the tray transfer means 10 by an operation similar to that of taking out the tray from the tray guide 8 or 8'. The tray 9 returned to the tray transfer means 10 is moved back to the tray guide 8 or 8' by an operation reverse to that of transferring the tray to the disk player 11 or 11'.

Figure 14:
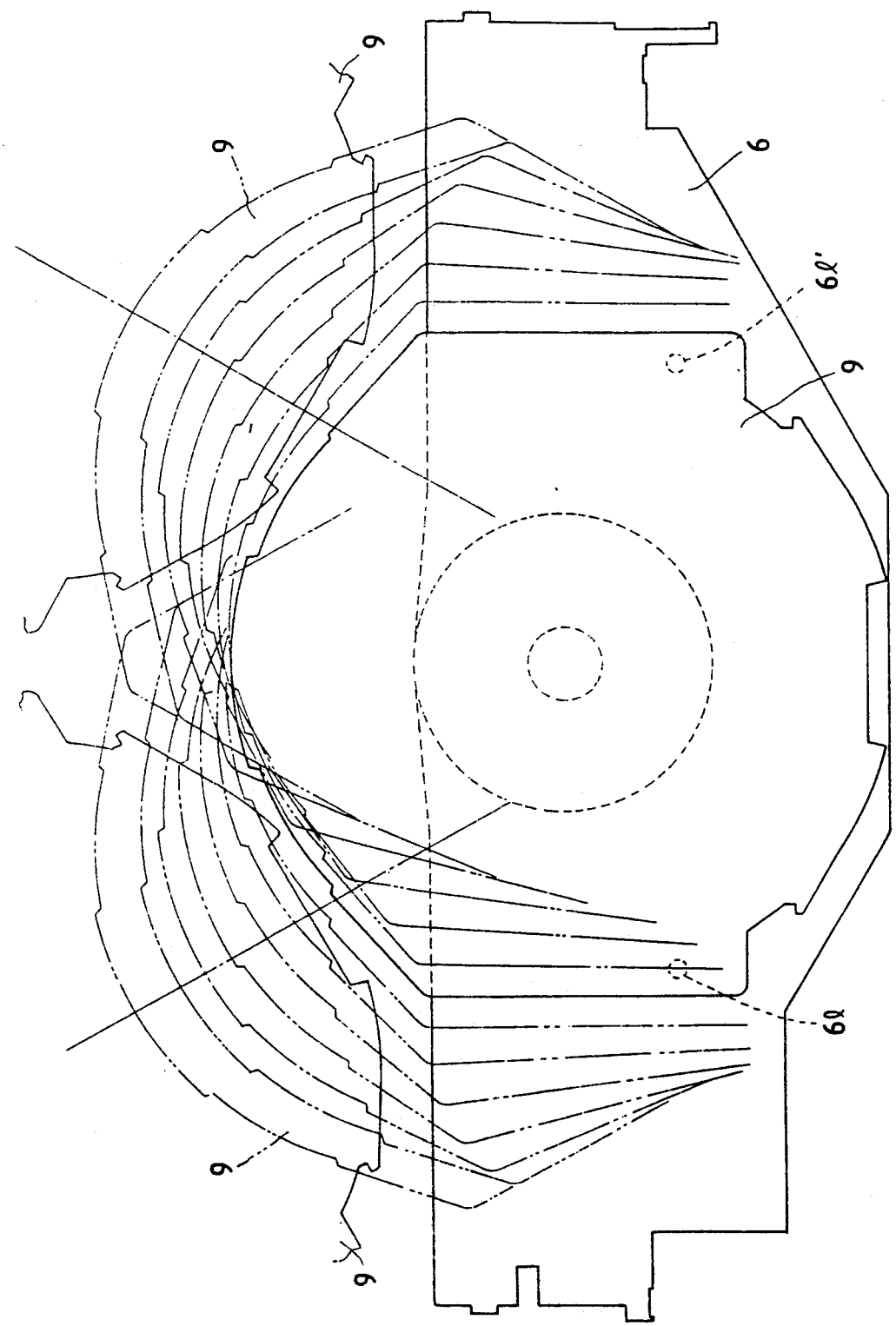
Figure 15:
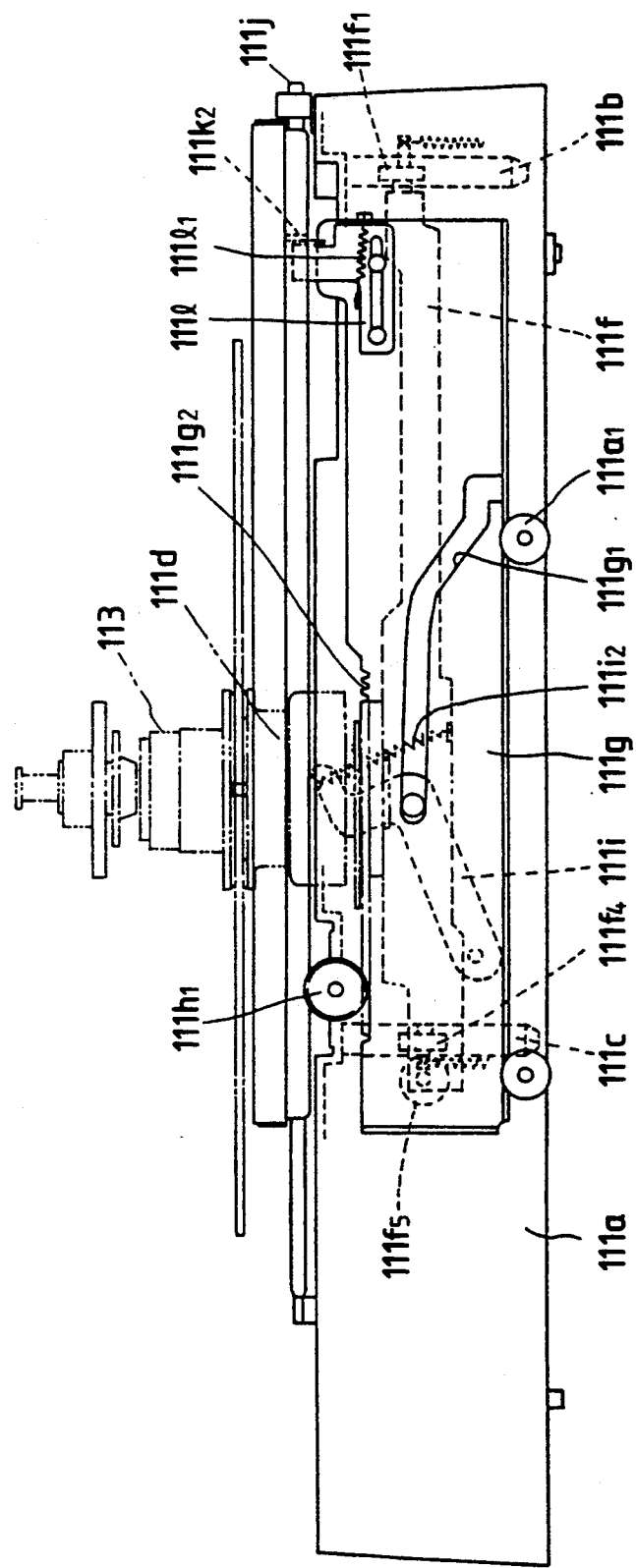
FIG. 15 is a front view of a lower disk player unit.

FIG. 14 is a plan view of the tray 9 being transferred.

Figure 16:
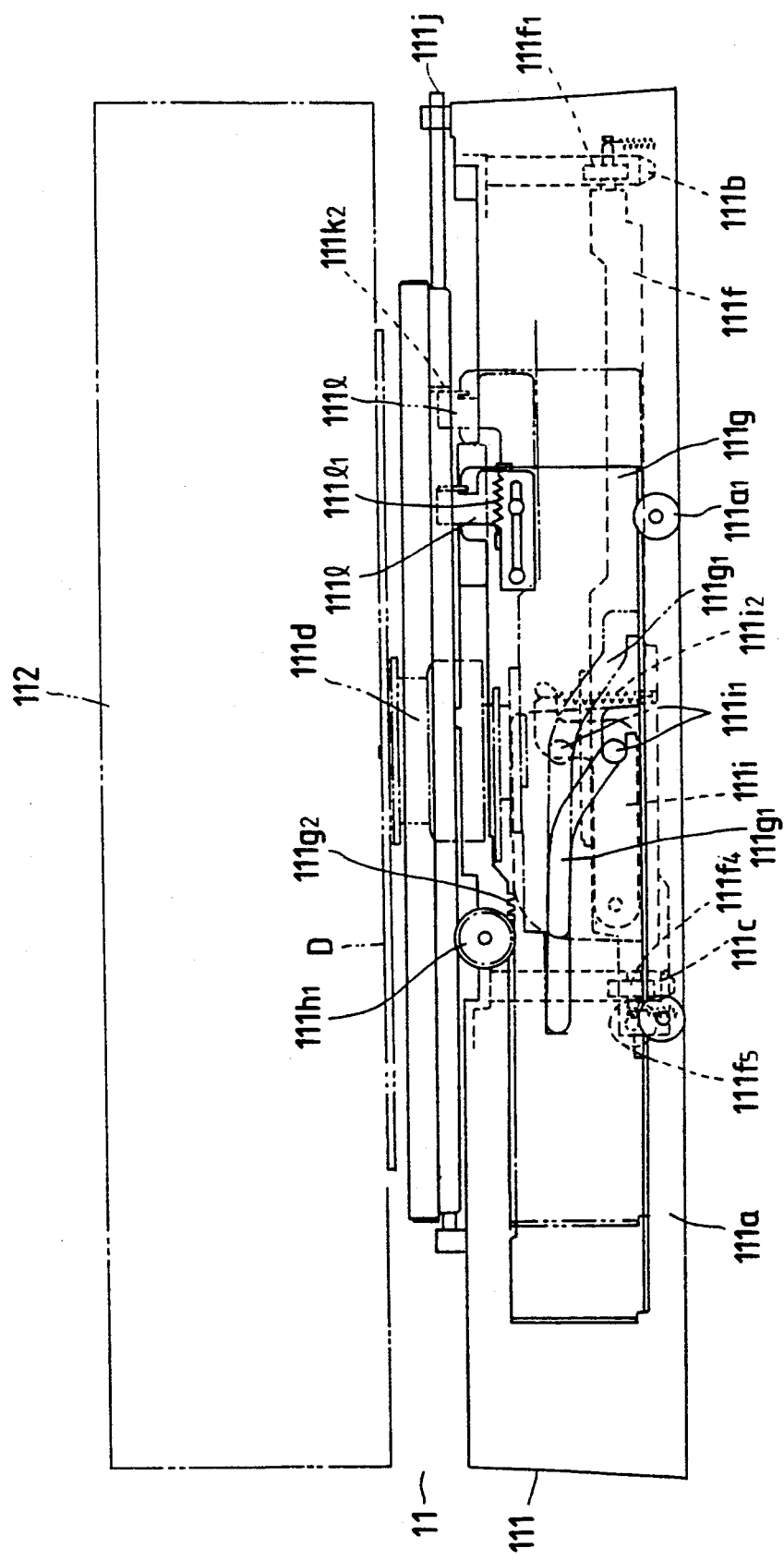
FIG. 16 is a front view of the player unit in a moved state.
Figure 17:
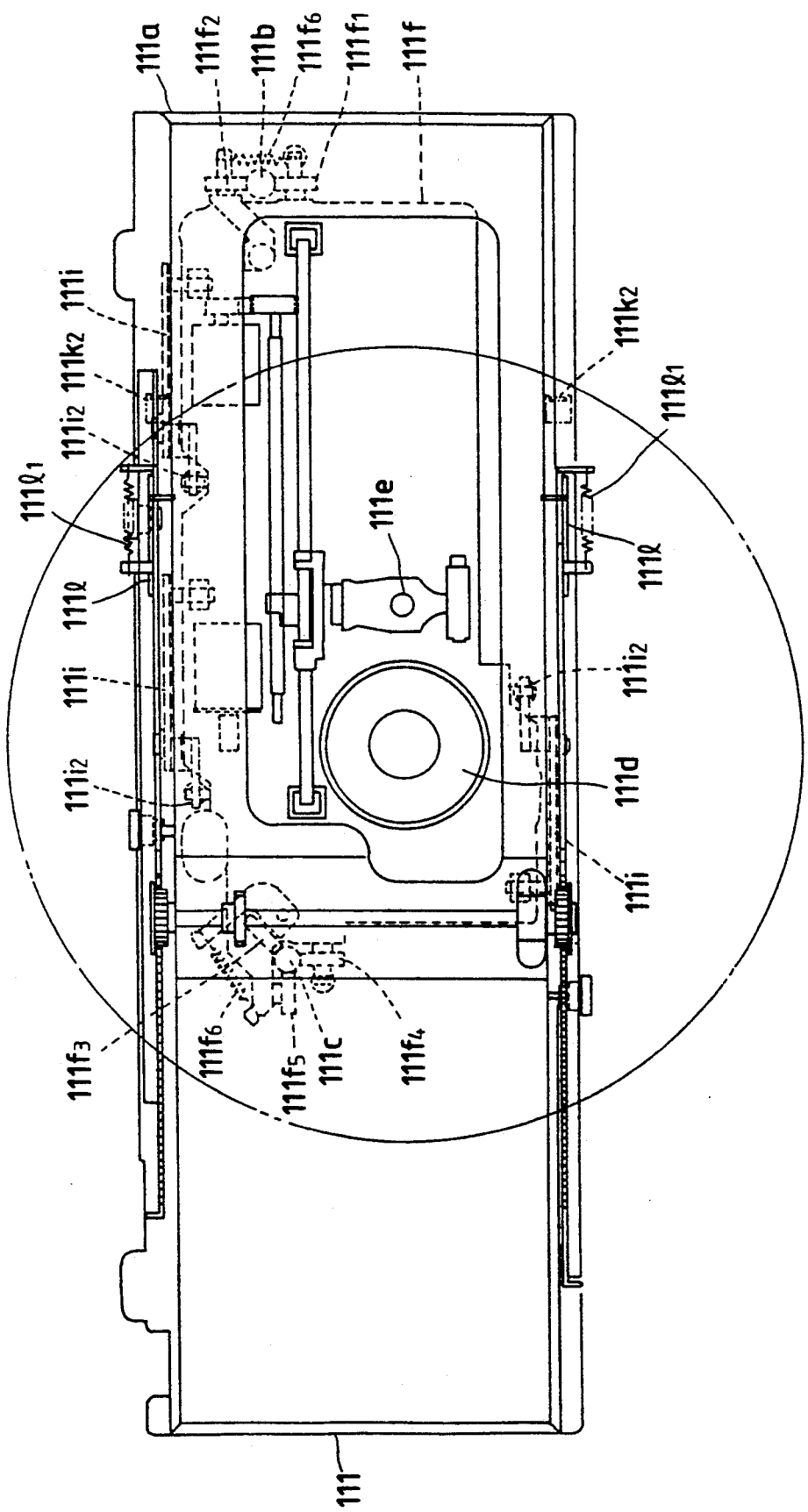
FIG. 17 is a plan view of the player unit.
Figure 18:
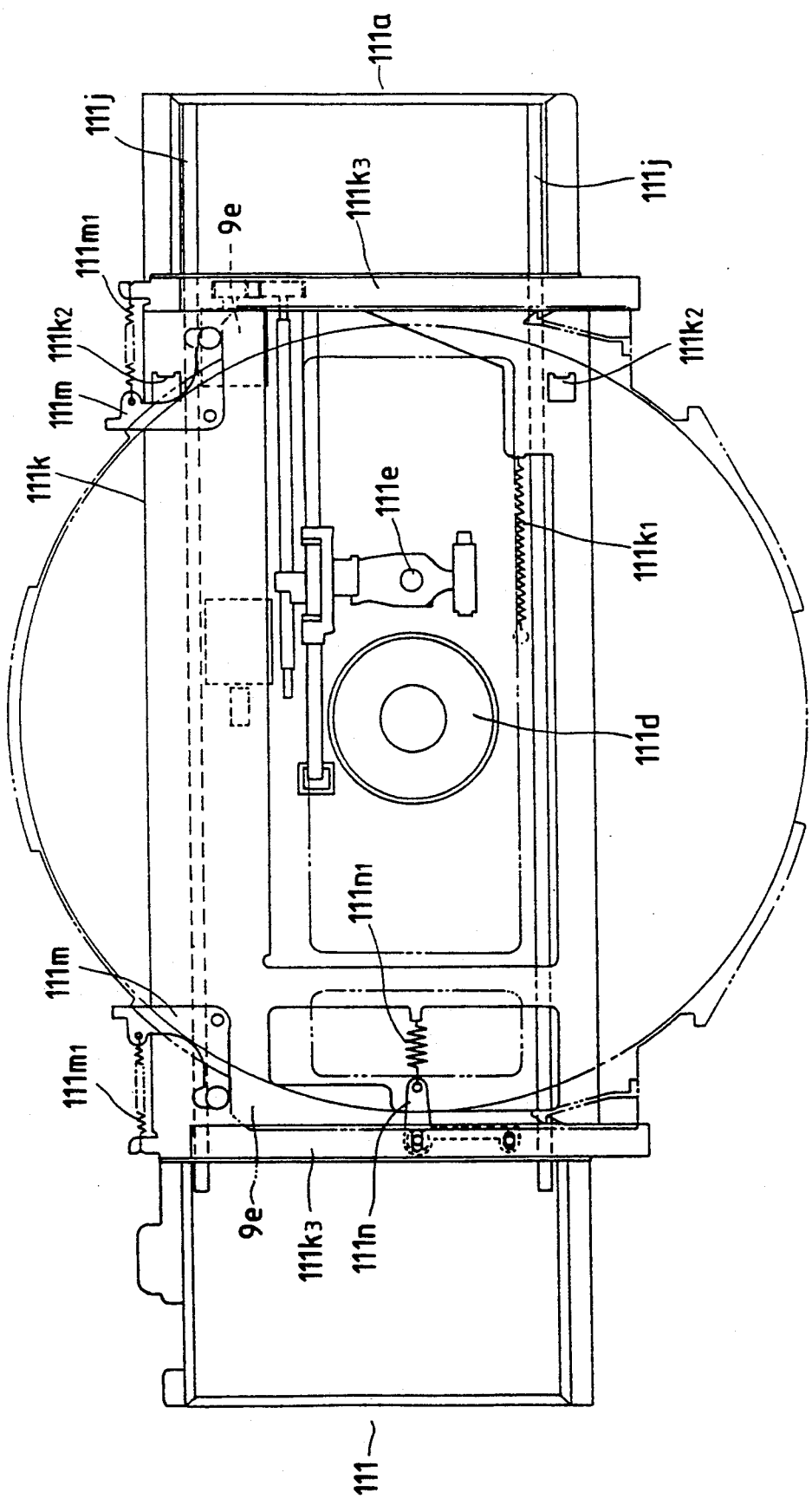
FIG. 18 is a plan view of the player unit fitted with a tray moving frame.

The constitution of the disk players 11 and 11' installed in the case 1 at the upper and lower portions thereof is described with reference to FIGS. 15, 16, 17, 18, 19, 20, 21, 22, 23, 24, 25 and 26 from now on. Since the disk players 11 and 11' are the same as each other in constitution, the constitution of only the upper disk player 11 is described herein. The disk player 11 includes pickups 111e which are located over and under the disk D to read recorded information from both the sides of the disk while the disk is supported by a turntable unit and a clamper. The disk player 11 is composed of an upper and a lower disk player units 112 and 111 disposed at a prescribed distance from each other as shown in FIG. 16.

The constitution of the lower disk player unit 111 is first described in detail with reference to FIGS. 15, 16, 17, 18 and 19. The lower disk player unit 111 includes a box 111a, support shafts 111b and 111c, the conventional turntable unit 111d, the pickup 111e, a pickup base 111f, sliding plates 111g, a rotary shaft 111h, swing arms 111i, guide bars 111j, a tray moving frame 111k, moving plates 111l, a pair of L-shaped push-out swing plates 111m, and an L-shaped push plate 111n. The box 111a is secured to the case 1. The support shafts 111b and 111c extend from the box 111a. The pickup base 111f is fitted with the pickup 111e, which is horizontally moved to read recorded information from the disk D pinch-held by the turntable unit 111d and the clamper described hereinafter. The pickup base 111f is also fitted with a fixed roller 111$f_1$ and a displaceable roller 111$f_2$ at one end of the base. The fixed roller 111$f_1$ is disposed in contact with the support shaft 111b. The displaceable roller 111$f_2$ is disposed in elastic contact with the support shaft 111b by a spring 111$f_6$. The pickup base 111f is furthermore fitted with two fixed rollers 111$f_4$ and 111$f_5$ and a displaceable roller 111$f_3$ at the other end of the base. The fixed rollers 111$f_4$ and 111$f_5$ are disposed in contact with the support shaft 111c. The displaceable roller 111$f_3$ is disposed in elastic contact with the support shaft 111c by a spring 111$f_6$. As a result, the pickup base 111f is supported by the rollers 111$f_1$, 111$f_2$, 111$f_3$, 111$f_4$ and 111$f_5$ so that the base can be only moved up and down. The sliding 111g are slidably supported by rollers 111a provided at the front and rear of the box 111a. The sliding plate 111g at the front of the box 111a has a guide hole 111$g_1$ curved with an obtuse angle. The other sliding plate 111g at the rear of the box 111a has two guide holes each curved with an obtuse angle but not shown in the drawings. The sliding plates 111g are formed with racks 111$g_2$ at portions of the upper edges of the plates. The racks 111$g_2$ are engaged with gears 111$h_1$ secured to both the ends of the rotary shaft 111h, which is rotated by a motor not shown in the drawings. When the motor is driven so that the gears 111$h_1$ are rotated, the sliding plates 111g are moved leftward with regard to FIG. 16. The pickup base 111f is fitted with the swing arms 111i each supported at one end thereof. Pins 111$i_1$ project from the nearly central portions of the swing arms 111i and are inserted into the guide holes 111$g_1$ of the sliding plates 111g. A spring 111$i_2$ is anchored in a tensile manner to the tip of each of the swing arms 111i and the pickup base 111f. When the sliding plates 111g are moved rightward with regard to FIG. 16 as mentioned above, the swing arms 111i are moved upward as in FIG. 15 so that the base 111f is lifted by the forces of the springs 111$i_2$. As a result, the turntable unit 111d moves up the disk D in the tray 9. The guide bars 111j are disposed at the front and rear upper edges of the box 111a so as to guide the tray moving frame 111k when it is moved. A spring 111$k_1$ is anchored in a tensile manner to the tray moving frame 111k and the box 111a and always urges the frame leftward with regard to FIGS. 18 and 19. Vertical lugs 111$k_2$ extend down from the bottoms of the front and rear of the tray moving frame 111k and are in contact with the moving plates 111l which are coupled to the sliding plates 111g so that the moving plates are horizontally movable. A spring 111$l_1$ is anchored in a tensile manner to each sliding plate 111g and the corresponding moving plate 111l and always urges the moving plate rightward with regard to FIG. 17. While the sliding plates 111g are moved from positions shown by full lines in FIG. 16, to other positions shown by dotted lines therein, the pickup base 111f is lifted so that the turntable unit 111d moves up the disk D in the tray 9. When the sliding plates 111g have reached the positions shown by the dotted lines in FIG. 16, the tips of the moving plates 111l come into contact with the vertical lugs 111$k_2$ of the tray moving frame 111k. When the sliding plates 111g are then moved to positions shown in FIG. 15, the tray moving frame 111k is moved against the force of the spring 111$k_1$ so that the frame is stopped at the end of the box 111a as shown in FIG. 19. The excess movement of each sliding plate 111g is absorbed by the spring 111$k_1$. As a result, the peripheral edge of the tray 9 is not located in the range of the movement of the pickup 111e. For that reason, the tray can be made nearly equal in size to the disk D. Tray guides 111$k_3$ similar to the tray guides 8 and 8' attached to the body of the case 1 are secured to the right and left sides of the tray moving frame 111$k$ so that the tray 9 brought by the tray transfer means 10 is inserted into the tray guides 111$k_3$. The tray guides 111$k_3$ are formed with projections 111$k_4$, which are engaged with the elastic engagement lugs 9$f$ of the tray 9. The pair of L-shaped push-out swing plates 111$m$ are attached to the tray moving frame 111$k$ at the rear thereof near both the sides thereof so that the plates are swingable. A spring 111$m_1$ is anchored in a tensile manner to the tray moving frame 111$k$ and one end of each push-out swing plate 111$m$ whose other end is in contact with the tip of the projection 9$e$ of the tray 9. The swing plate 111$m$ is always urged by the spring 111$m_1$ in such a direction as to put out the tray 9. The L-shaped push plate 111$n$ is attached to the tray moving frame 111$k$. One end of the plate 111$n$ is inserted in the tray guide 111$k_3$. A spring 111$n_1$ is anchored in a tensile manner to the other end of the push plate 111$_n$ and the tray moving frame 111$k$ so that the side of the projection 9$e$ of the tray 9 inserted in the tray guides 111$k_3$ is pushed by the push plate to prevent the tray from moving either rightward or leftward due to a clearance. For that reason, in the state that the tray 9 is inserted in the guide rails 111$k_3$ and the elastic engagement lugs 9$f$ of the tray are engaged with the projections 111$k_4$, the push plate 111$n$ pushes the side of the projection 9$e$ of the tray to prevent it from moving either rightward or leftward due to the clearance. When the elastic engagement lugs 9$f$ and the projections 111$k_4$ are disengaged from each other, the push-out swing plates 111$m$ push out the tray 9. When the lugs 9$f$ and the projections 111$k_4$ remain engaged with each other, the push-out swing plates 111$m$ prevent the tray 9 from moving either forward or backward due to a clearance.

Figure 20:
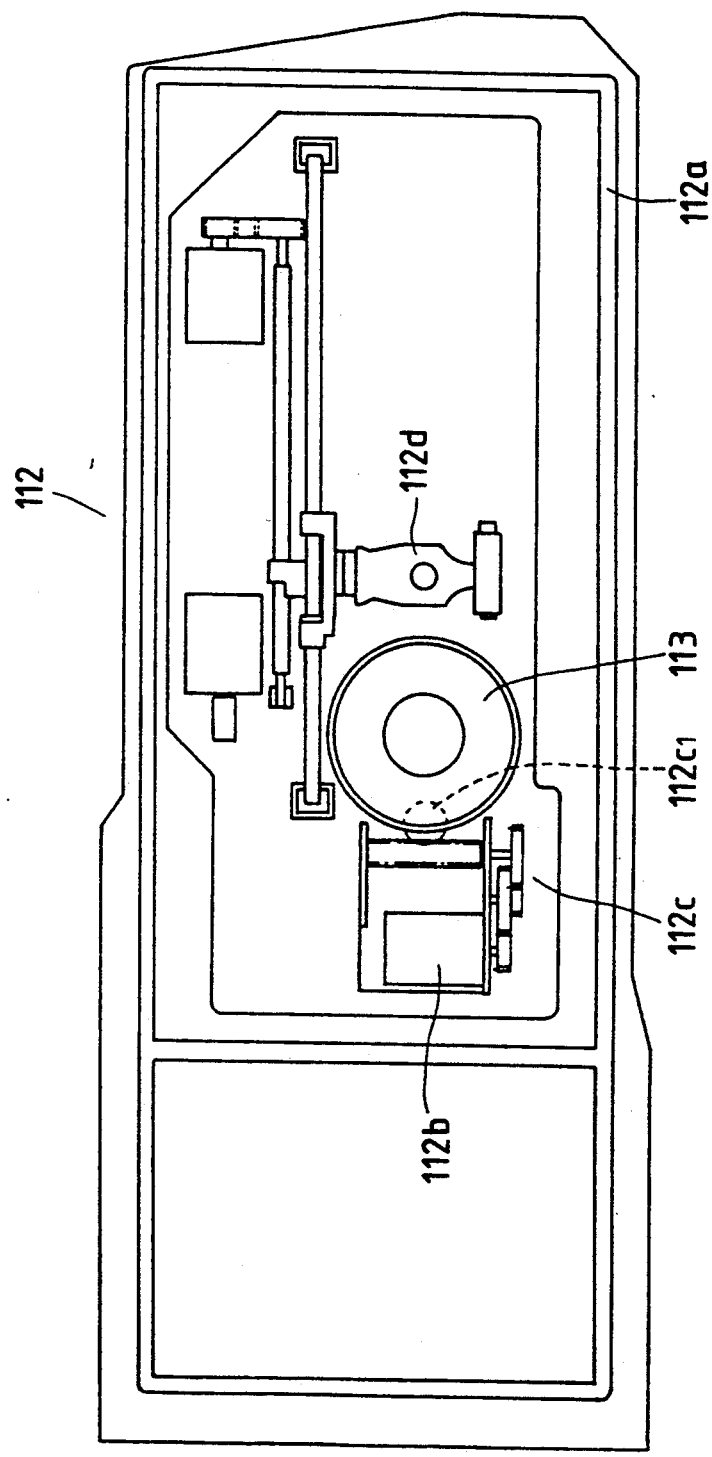
FIG. 20 is a bottom view of an upper disk player unit.
Figure 21:
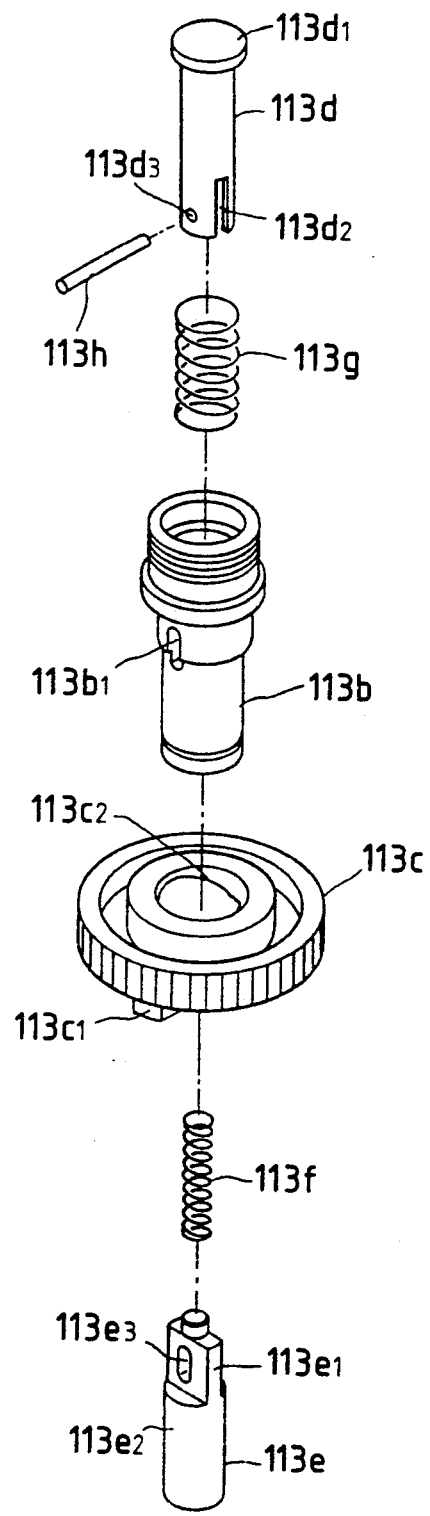
FIG. 21 is a perspective exploded view of a part of a clamper at the upper disk player unit.

The constitution of the upper disk player unit 112 is now described with reference to FIG. 20. The upper disk player unit 112 includes a box 112$a$, a motor 112$b$, a speed reduction gear train 112$c$, the pickup 112$d$ supported to be horizontally movable, and the clamper 13 supported in the box 12$a$ so that the clamper can be moved up and down by the motor 112$b$ and the speed reduction gear train 112$c$. The pickup 112$d$ functions to read recorded information from the disk D pinched by the clamper 113 and the turntable unit 111$d$ of the lower disk player unit 111. If the disk D is a video disk consisting of two circular plates conjoined to each other, the center hole of the lower circular plate is likely to be non-coincident with that of the upper circular plate so that the turntable unit 111$d$ is eccentric to the center hole of the upper circular plate of the disk centered by the turntable unit and pinched by the clamper 13 and the turntable unit. In the case of the eccentricity, the disk D rotates eccentrically to the upper pickup 112$d$ to make it difficult to properly track the disk. In order to avoid such difficulty, the disk D, from the upper circular plate of which recorded information is to be read by the pickup 112$d$, is centered by the clamper 113 and then pinched between the turntable unit 111$d$ and the clamper.

The clamper 113 is described in detail with reference to FIGS. 21, 22, 23, 24, 25 and 26. The clamper 113 includes a base 113$a$, a pipe 113$b$, a gear 113$c$, a hollow shaft 113$d$, a rod 113$e$, springs 113$f$ and 113$g$, a pin 113$h$, a support plate 113$i$, a spring 113$j$, a disk push plate 113$k$, a mounting plate 113$l$, and a position restricting plate 113$m$ for positioning the disk D. The base 113$a$ is secured to the box 112$a$ by an appropriate means. The pipe 113$b$ is secured in the central portion of the base 113$a$. The final gear 112$c_1$ of the speed reduction gear train 112$c$ is supported by the base 113$a$. The base 113$a$ is fitted with a switch 113$a_1$, with which operating pins 113$c_1$ provided at an angular interval of 180 degrees on the bottom of the peripheral portion of the gear 113$c$ supported by the pipe 113$b$ under the base 113$a$ and engaged with the final gear 112$c_1$ are alternately put into contact. The gear 113$c$ has a cam portion 113$c_2$ inside the operating pins 113$c_1$. The hollow shaft 113$d$ is formed with a spring engaging flange 113$d_1$ at the upper end of the shaft, and has notches 113$d_2$ extending at the lower end of the shaft and facing each other, and pin fitting holes 113$d_3$ facing each other and located at the lower end of the shaft at angular intervals of 90 degrees from the notches. The rod 113$e$ has an upper flat portion 113$e_1$ inserted in the notches 113$d_2$ of the hollow shaft 113$d$, a lower round portion 113$e_2$, and a slender hole 113$e_3$ provided in the upper flat portion. The spring 113$f$ is housed in the hollow shaft 113$d$. The hollow shaft 113$d$ and the spring 113$g$ are inserted down into the pipe 113$b$. The rod 113$e$ is inserted up into the pipe 113$b$ so that the upper flat portion of the rod is fitted in the notches 113$d_2$ of the pipe. The pin 113$h$ is then inserted into one of slender holes 113$b_1$ provided in the pipe 113$b$ and facing each other, so that the pin extends through the hollow shaft 113$d$, the slender hole 113$e_3$ of the rod 113$e$ and the other slender hole 113$b_1$ and projects at both the ends of the pin from the pipe 113$b$. As a result, the projecting ends of the pin 113$h$ are in contact with the cam portion 113$c_2$ of the gear 113$c$, the hollow shaft 113$d$ and the rod 113$e$ are coupled to each other by the pin, and the spring 113$f$ urges the rod in such a direction as to move the rod away from the shaft. The support plate 113$i$ is borne so that it can be moved up and down relative to the pipe 113$d$. The plate 113$i$ is always urged downward by the spring 113$j$. The disk push plate 113$k$ is rotatably supported with a bearing 113$i_1$ by the support plate 113$i$. The mounting plate 113$l$ is secured to the lower end of the rod 113$e$ by a screw. The position restricting plate 113$m$ is rotatably supported with a bearing 113$l_1$ by the mounting plate 113$l$. The peripheral portion 113$m_1$ of the position restricting plate 113$m$ is tapered to coincide with the center hole of the disk D. The central tubular portion 113$m_2$ of the position restricting plate 113$m$ projects down so that the center shaft 111$d_1$ of the turntable unit 111$d$ is inserted into the central tubular portion.

The body 111$d_3$ of the turntable unit 111$d$ is rotated by a motor 111$d_2$ provided therein. A disk position restricting plate 111$d_5$ is attached to the central portion of the body 111$d_3$ and urged upward by a spring 111$d_4$.

Figure 22:
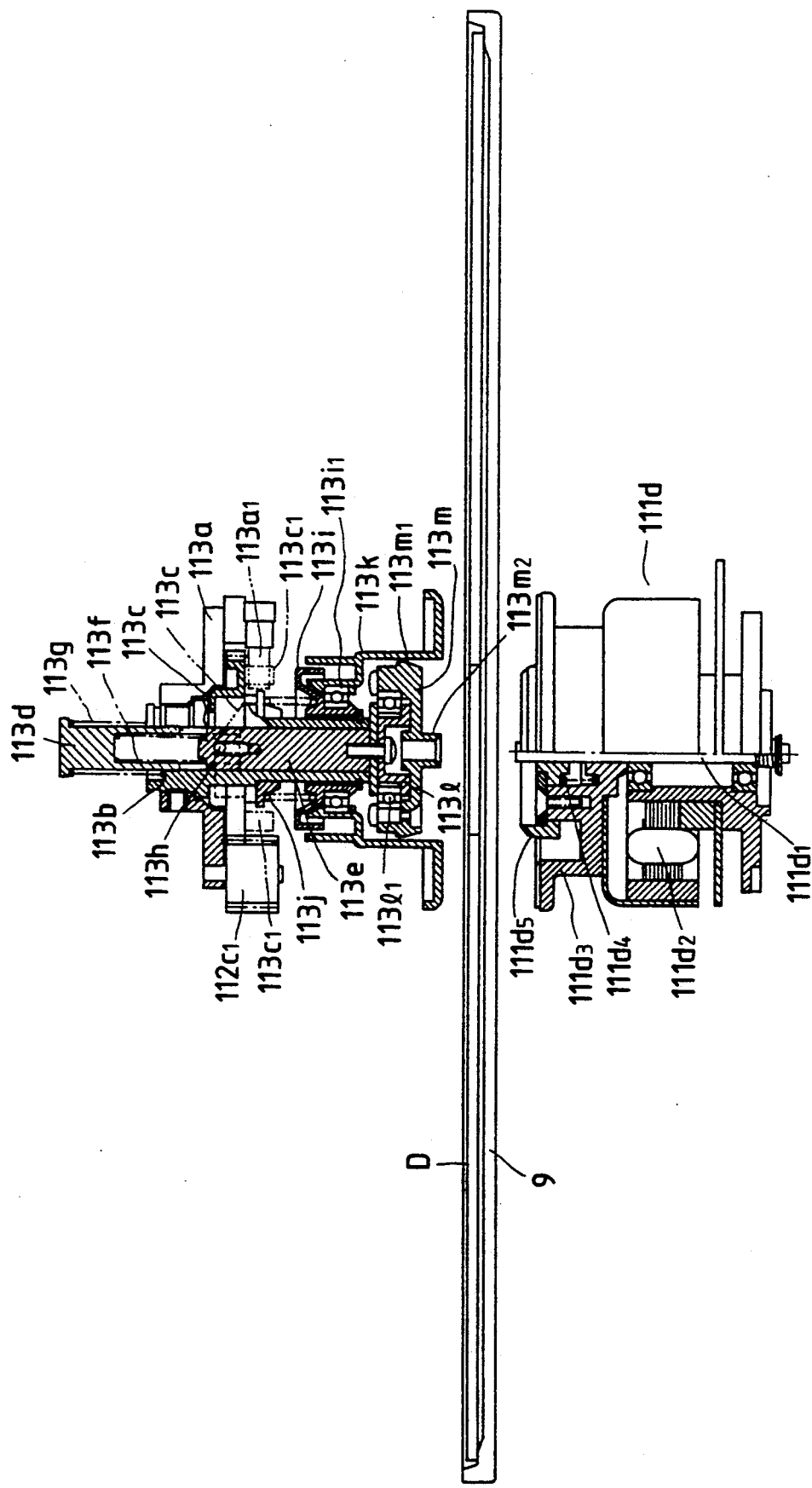
Figure 23:
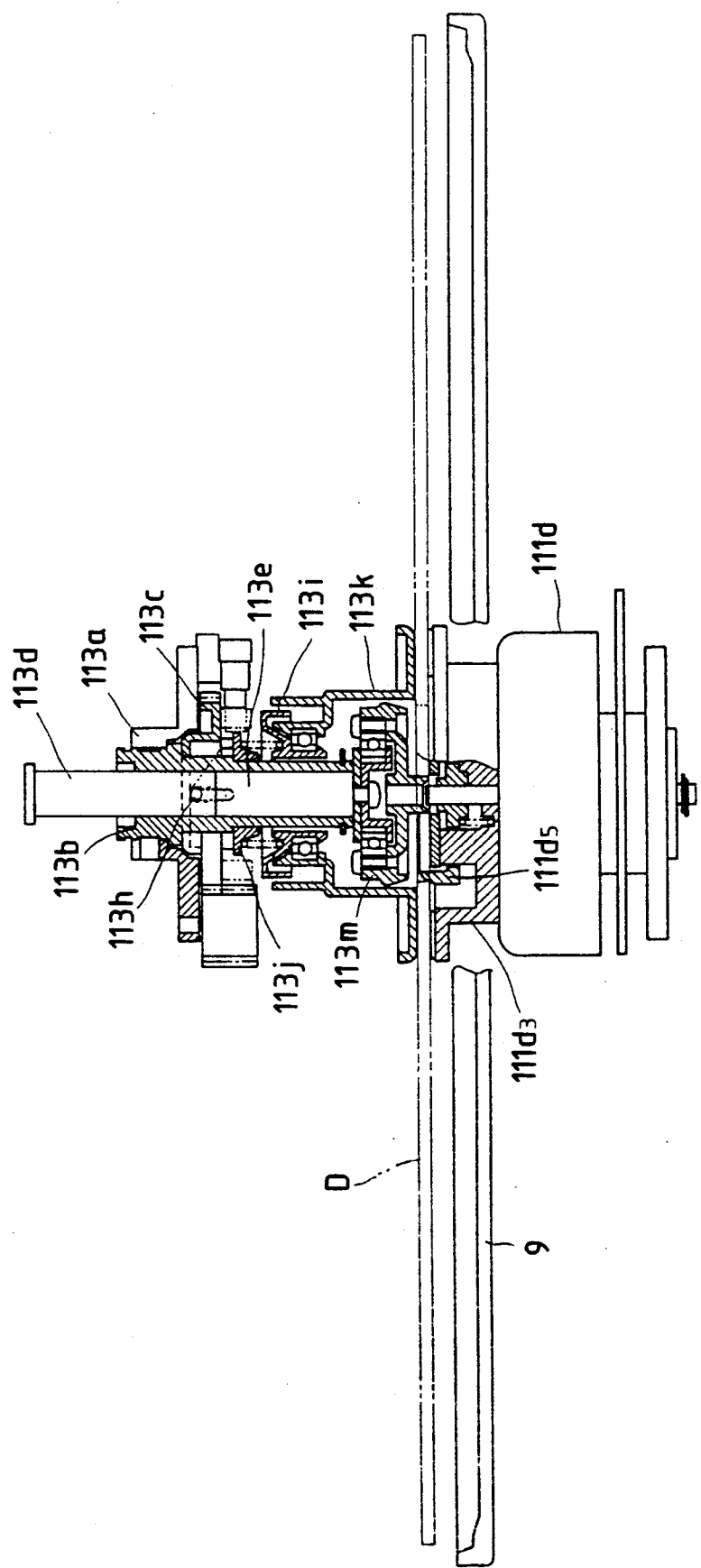

Pinching the disk D by the turntable unit 111$d$ and the clamper 113 to play the disk is described from now on. When an instruction for playing the lower side of the disk D contained in the tray 9 as shown in FIG. 22 is applied as the tray is in the tray guides 111$k_3$ of the tray moving frame 111$k$, the sliding plates 111$g$ are moved so that the pickup base 111$f$ is lifted. As a result, the turntable unit 111$d$ is moved up. At that time, the position restricting plate 111$d_5$ is inserted up into the center hole of the disk D so that the disk is positioned by the turntable unit 111$d$. When the turntable unit 111$d$ is moved up further, the body 111$d_3$ thereof pushes up the disk D toward the disk push plate 113$k$ of the clamper 113 so that the disk is pinched between the turntable unit body and the disk push plate as shown in FIG. 23.

Figure 24:
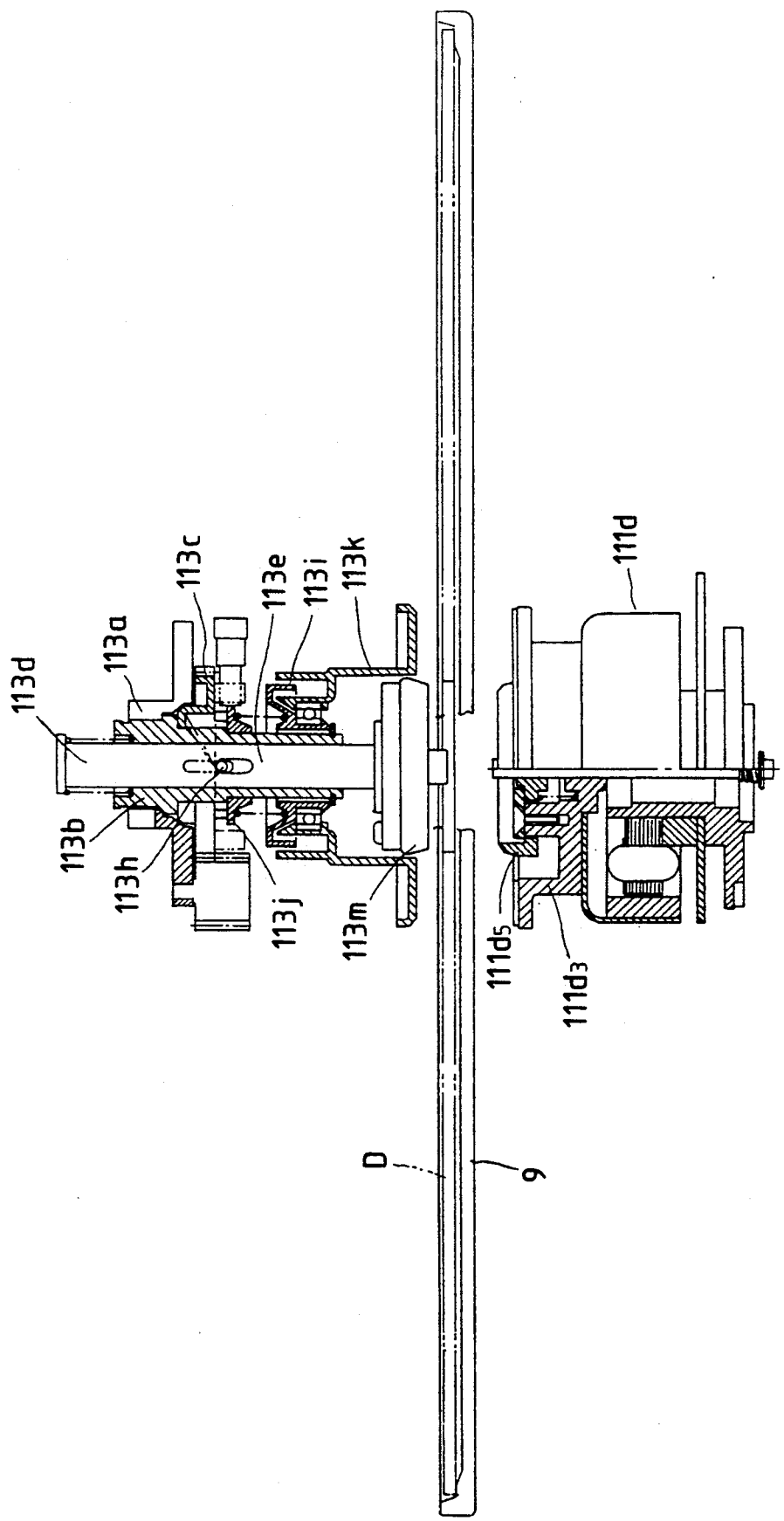
Figure 25:
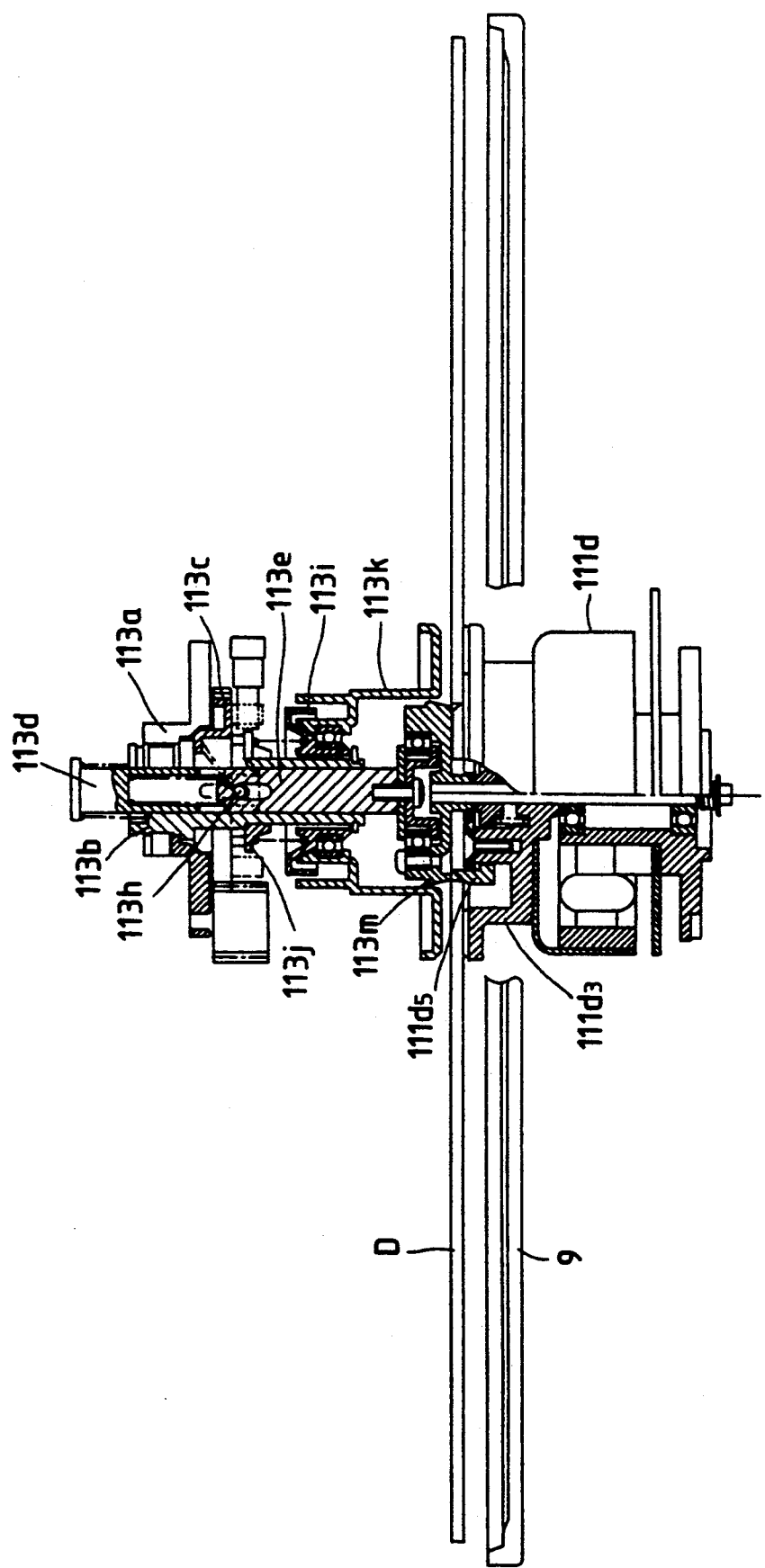

The motor $111d_2$ of the turntable unit $111d$ is then driven to rotate the disk D to read the recorded information therefrom as the pickup $111e$ is moved. When an instruction for playing the upper side of the disk D contained in the tray 9 (the disk pinched between the turntable unit $111d$ and the clamper 113 can be returned into the tray 9 by an operation reverse to that described above) is applied, the motor $112b$ is driven so that the final gear $112c_1$ of the speed reduction gear train $112c$ is rotated to turn the gear $113c$ of the clamper until the operating pin $113c_1$ of the gear $113c$ comes into contact with the switch $113a_1$. At that time, the pin $113h$ is moved down due to the action of the cam portion $113c_2$ of the gear $113c$ so that the hollow shaft $113d$ and the rod $113e$ are moved down against the force of the spring $113g$. As a result, the central tubular portion $113m_2$ of the position restricting plate $113m$ is inserted down into the center hole of the disk D as shown in FIG. 24. The sliding plates $111g$ are moved similarly to the above-described operation for the playing of the lower side of the disk D so that the turntable unit $111d$ is lifted. Since the position restricting plate $113m$ is already in a moved-down position at that time, the fixed center shaft $111d_1$ of the turntable unit $111d$ is inserted up into the central tubular portion $113m_2$ of the position restricting plate. Besides, the position restricting plate $111d_5$ is inserted into the center hole of the disk D, and the top of the body $111d_3$ of the turntable unit $111d$ comes into contact with the lower side of the disk, as shown in FIG. 25. When the turntable unit $111d$ is moved up further, the central portion of the position restricting plate $111d_5$ comes into contact with the lower end of the central tubular portion $113m_2$ of the position restricting plate $113m$ of the clamper 113 so that the position restricting plate $111d_5$ is stopped by the other position restricting plate $113m$. The body $111d_3$ of the turntable unit $111d$ is then lifted further so that the disk D is moved up by the body $111d_3$ of the unit. As a result, the disk D is separated from the position restricting plate $111d_5$ at the center hole of the disk and then fitted on the peripheral potion $113m_1$ of the position restricting plate $113m$ at the center hole of the disk so that the disk is positioned by the plate $113m$. When the lifting of the turntable unit $111d$ is completed, the body $111d_3$ of the turntable unit pushes the disk D to the disk push plate $113k$ of the clamper 113 to pinch the disk between them as shown in FIG. 26. The motor $111d_2$ of the turntable unit $111d$ is then driven so that the disk D is rotated to be played.

The operation of the automatic disk changer as a whole is described from now on. When a desired program such as accompaniment music is chosen by a manipulating section not shown in the drawings, a control section not shown in the drawings judges which disk D the desired program is recorded in. The moving rest 6 is then moved depending on the result of the judgement so that the guide grooves $15b$ are made coincident with the tray guide 8 or 8' holding the disk D having the program. The motor $6i$ is then driven so that the swing plate 13 is swung rightward or leftward. Then the motor $10a$ is operated and the tray guide 15 is moved backward, the projections $8a$ of the tray guide 8 or 8' and the elastic engagement lugs $9f$ of the tray 9 are disengaged from each other by the disengaging pins $10o$, and the engagement arms $10k$ and the hooks $9g$ of the tray 9 are engaged with each other. After that, the motor $10a$ is rotated in reverse so that the tray 9 is pulled out from the tray guide 8 or 8' into the guide grooves $15b$. The motor $6i$ is then rotated in reverse so that the swing plate 13 is swung back to the neutral position. The moving rest 6 is thereafter moved to the upper or lower disk player 11 or 11' so that the guide grooves $15b$ of the tray transfer means 10 are made coincident with the tray guides $111k_3$ of the lower disk player unit 111 of the upper or lower disk player 11 or 11'. At that time, if the upper disk player 11 is in playback, the moving rest 6 is moved to the lower disk player 11'. If the lower disk player 11' is in playback, the moving rest 6 is moved to the upper disk player 11. The motor $10a$ is then driven to move the moving plate 15 backward to transfer the tray 9 out of the guide grooves $15b$ to the tray guides $111k_3$ so that the elastic engagement lugs $9f$ of the tray are engaged with the projections $111k_4$ and the tray is held in the tray guides $111k_3$ by the presence of the push plate $111n$. The motor not shown in the drawings is then driven to move the sliding plates $111g$ to lift the turntable unit $111d$ to move up the disk D from the tray 9, pinch the disk between the turntable unit and the clamper 113 and position the disk by the turntable unit. After the positioning of the disk D is completed, the tray moving frame $111k$ is moved rightward by the movement of the sliding plates $111g$. As a result, the tray 9 is put out of the range of the movement of the pickup $111e$ so that recorded information can be read from the lower side of the disk by the pickup as it is moved along the disk. If recorded information is to be read from the upper side of the disk D, the motor $112b$ is first driven so that the position restricting plate $113m$ is moved down. The sliding plates $111g$ are thereafter moved so that the disk is pinched between the turntable unit $111d$ and the clamper 113 and positioned by the clamper. The pickup $112d$ is then moved to read the recorded information from the upper side of the disk D. After the reading of the recorded information from the disk D is completed, the disk is put back into the tray 9 and returned into the tray guide 8 or 8' by an operation reverse to that described above.

According to the present invention, pairs of right and left tray guides for housing trays are provided in an automatic disk changer so that the center line of each right tray guide and that of the left tray guide corresponding thereto extend toward a tray transfer means and meet each other in the form of a V and the center of swinging of the means is located inside the point of the meeting of the center lines. The tray transfer means is thus disposed near the tray guides so that the depth of the case of the changer is reduced. Therefore, the size of the changer is decreased.

According to the present invention, a pair of gears are engaged with a worm having two spiral grooves, so that the gears are rotated synchronously with each other to move engagement arms backward or forward synchronously with each other relative to a tray to pull out or insert the tray the engagement arms are thus engaged with the engagement portions of the tray at the same time as each other to securely pull out or insert the tray.

According to the present invention, elastic engagement lugs formed on a tray in order to hold the tray in each of tray guides provided in a case and a disk player, and projections formed on the tray guides are disengaged from each other by disengaging pins provided in a tray transfer means. The elastic engagement lugs and the projections are thus surely disengaged from each other by a simple-structured mechanism when the tray is pulled out from the tray guide through the engagement of the engagement arms of the tray transfer means and the hooks of the tray. For that reason, the constitution of an automatic disk changer is made simpler than that of a conventional automatic disk changer and the operation of the former changer is made surer than that of the latter changer. Besides, the former changer is less likely to develop a trouble and can be manufactured less expensively than the latter changer.

According to the present invention, a disk tray is formed with elastic engagement lugs on both sides of the tray so that the lugs are engaged with projections formed on each of the tray guides provided in a case and a disk player, in order to hold the tray in the tray guide. The disk tray is thus securely held in the tray guide by a holding means of simpler constitution than a conventional holding means. The former holding means is less likely to develop problems and can be manufactured less expensively than the latter holding means. If a push-out swing plate for preventing the disk tray from moving due to a clearance is provided at the tray guide provided in the disk player, the elastic engagement lugs also serve as stoppers to more securely hold the tray in the tray guide.

According to the present invention, a tray transfer device is provided so that the device is swung to such a position as to be opposed to one of tray guides and is then moved backward and forward to and from the position in order to pull out a tray from the tray guide and then insert the tray into another of the tray guides. For that reason, the depth of a case can be made smaller to reduce the size of the tray transfer device. Since the device performs a relatively simple motion, the device can be smoothly and quickly operated. For that reason, the device is less likely to develop problems, and it takes less time for the device to transfer the tray. Therefore, the time from the end of playback of a disk to the start of that of another disk is shorter.

What is claimed is:

1. An automatic disk changer wherein tray guides are provided on a large number of levels in a case at first and second corner portions thereof so that a center line of each of said tray guides on each of said levels at said first corner portion and a center line of each of said tray guides on each of said levels at said second corner portion extend toward a tray transfer means and meet each other at a point in the form of a V; and said tray transfer means movable up and down between each of said tray guides and a disk player for playing a disk in a tray transferred by said tray transfer means, swingable from a central portion to positions corresponding to said tray guides on each of said levels at said first and second corner portions, and movable backward and forward, to and from each of said tray guides.

2. The automatic disk changer according to claim 1, wherein said point of said meeting of each of said center lines is located outside the center of said swinging of said tray transfer means.

3. An automatic disk changer comprising a tray transfer means, by which a tray is pulled out from a tray guide provided in a case and is then transferred to a disk player and by which said tray is pulled out from said player and then transferred to said tray guide, said transfer means includes a moving base plate which is moved up and down between said tray guide and said player, a motor mounted on said plate, a worm gear which has two spiral grooves and is rotated by said motor, a pair of gears engaged with said worm gear and located opposite each other across said worm gear, a pair of large gears connected by endless belts to pulleys formed on the former gears, control arms which are swung along with the rotation of said large gears, and engagement arms which are moved backward or forward along the swing of said control arms so as to pull out or insert said tray.

4. An automatic disk changer in which one of a plurality of trays is pulled out by a tray transfer means from one of a plurality of tray guides provided on a large number of levels in a case and is then transferred to a disk player by said tray transfer means; and said tray is pulled out from said disk player and transferred back to said tray guide by said tray transfer means, wherein each of said trays is formed with elastic engagement lugs and hooks on both the sides of the tray; said tray guides provided in said case so as to guide said trays to insert them into said tray guides, and further tray guides provided in said disk player are formed with projections, with which said lugs are engaged; and said tray transfer means includes engagement arms, which are engaged with said hooks when said tray is pulled out from one of said further tray guides, and disengaging pins for engaging said lugs and said projections from each other.

5. A disk tray for an automatic disk changer in which said disk tray containing a disk is pulled out by a tray transfer means from one of a plurality of tray guides provided on a large number of levels in a case and is then transferred to a disk player by said tray transfer means so that said disk is played by said disk player, wherein said disk tray is formed with a pair of elastic engagement lugs, which are engaged with projections formed on each of said tray guides or with projections formed on a further tray guide provided in said disk player, in order to hold said disk tray in a corresponding said tray guide or further tray guide by said engagement; and said disk tray is formed with hooks, which are engaged with the engagement arms of said tray transfer means in order to pull out said disk tray from each of said tray guides or further tray guides.

6. A tray transfer device for an automatic disk changer, in which a tray is pulled out from one of a plurality of tray guides provided on a large number of levels in a case at the right and left portions thereof, each of said tray guides having a pair of guide rails obliquely extending toward the center of said case, and wherein said tray is then transferred to a tray guide provided in a disk player, so that a disk in said tray is played by said disk player, comprising a moving base which can be moved up and down between said disk player and each of said tray guides provided in said case; a swing plate which can be put in three positions, wherein one position is such a front position on said base as to be opposed to said tray guide provided in said disk player, and the other two positions on said base are arranged so as to be opposed to said tray guides provided in said case at the right and left portions thereof; a moving plate which can be moved, on said swing plate, forward and backward relative to said tray guides provided in said disk player or said case as said swing plate is in each of said three positions; and engagement arms attached to said moving plate so that said arms are engaged with said tray inserted in one of said tray guides provided in said disk player or said case, to pull out said tray therefrom, and are disengaged from said tray after said tray is inserted into another of said tray guides provided in said disk player or said case.

7. An automatic disk changer comprising:

a case;

a disk player in said case for playing disks transferred thereto;

a plurality of trays, each one provided for holding a disk;

storage means in said case for storing said trays with disks thereon; and tray transfer means in said case for transferring trays with disks thereon between said storage means and said disk player;

said storage means comprising first and second columns of tray guides, each column of guides comprising tray guides in several levels such that there are two tray guides at a given level, one from each column; all said tray guides configured to hold a tray with a disk thereon;

each said tray guide has an axis of insertion/retraction along which trays are inserted into and retracted from said guides; all said tray guides in a column having their respective axes in a first plane and all said tray guides in said second column having their respective axis in a second plane, and both said columns positioned in said case so that said first and second planes intersect at a V shaped angle resulting in a line of intersection of said planes;

said tray transfer means positioned in front of said columns and moveable up and down along an axis parallel to said line of intersection to align itself at the level of any selected guide;

said tray transfer means further comprising extraction/insertion means moveable toward and away from said guides for selectively extracting and inserting trays in guides at the same level as said tray transfer means.

8. An automatic disk changer as claimed in claim 7 wherein said tray transfer means is positioned within said case between said columns, on the one hand, and said line of intersection, on the other.

9. An automatic disk changer as claimed in any of claims 7–8, wherein said tray transfer means further comprises:

swing plate means swingable between a central position facing intermediate said first and second columns of guides, a first position facing said first column of guides, and a second position facing said second column of guides;

said extraction/insertion means being positioned on said swing plate means and being swingable therewith to selectively face either columns of guides and an intermediate position thereof.

10. An automatic disk changer as claimed in claim 9, wherein said extraction/insertion means comprises;

a motor mounted on said swing plate;

a worm gear having two spiral grooves and rotated by said motor;

a pair of gears engaging said two spiral grooves, respectively;

a pair of rotary members and two endless belts, each said belt connecting one rotary member and one of said gears to cause said rotary members to rotate when said motor is operated;

a pair of swing arms responsive, respectively, to rotary movement of said rotary members; and a pair of engagement/release arms moveable toward and away from a said guide facing said swing plate for grabbing a tray in said guide and returning it to said tray transfer means, and for carrying a tray from said tray transfer means to said guide and releasing said tray.

11. An automatic disk changer as claimed in claim 10, wherein each said tray has elastic engagement lugs and hooks on both sides of said tray;

said tray guides having a construction to guide said trays therein and provided with projections with which said lugs are engaged for locking a said tray in said guide;

each said engagement/release arms comprising a pivotable hook for engaging a corresponding said hook on said tray and a disengaging pin for releasing the engagement of one of said lugs with one of said projections, so that said tray can be extracted from said guide when said engagement/release arms are moved away from said guide.

12. An automatic disk changer as claimed in claim 11, wherein each said engagement/release arm further comprises means for releasing a said tray held by the hooks of said engagement/release arms when said engagement/release arms move toward a said guide for delivering thereto said tray; and means for pushing said tray after release by said engagement/release arms further into said guide.

* * * * *